US008939792B2

(12) United States Patent
Takeuchi et al.

(10) Patent No.: US 8,939,792 B2
(45) Date of Patent: Jan. 27, 2015

(54) PATCH PANEL ASSEMBLY

(71) Applicant: Go!Foton Holdings, Inc., Somerset, NJ (US)

(72) Inventors: Kenichiro Takeuchi, North Brunswick, NJ (US); Haiguang Lu, Los Altos, CA (US)

(73) Assignee: Go!Foton Holdings, Inc., Somerset, NJ (US)

( * ) Notice: Subject to any disclaimer, the term of this patent is extended or adjusted under 35 U.S.C. 154(b) by 3 days.

(21) Appl. No.: 13/749,924

(22) Filed: Jan. 25, 2013

(65) Prior Publication Data
US 2013/0196538 A1    Aug. 1, 2013

Related U.S. Application Data

(60) Provisional application No. 61/591,714, filed on Jan. 27, 2012, provisional application No. 61/598,041, filed on Feb. 13, 2012, provisional application No. 61/666,346, filed on Jun. 29, 2012.

(51) Int. Cl.
*H01R 13/73* (2006.01)
*H01R 13/58* (2006.01)
*H04Q 1/06* (2006.01)
*H04Q 1/02* (2006.01)

(52) U.S. Cl.
CPC ............... *H01R 13/58* (2013.01); *H04Q 1/06* (2013.01); *H04Q 1/13* (2013.01)
USPC ........................................................ 439/571

(58) Field of Classification Search
USPC ................ 439/571, 713, 719, 532, 534; 385/135–136, 16–17
See application file for complete search history.

(56) References Cited

U.S. PATENT DOCUMENTS

| | | | |
|---|---|---|---|
| 2,865,979 | A | 12/1958 | Klassen |
| 4,688,885 | A | 8/1987 | Poteat et al. |
| 5,613,021 | A | 3/1997 | Saito et al. |
| 5,775,755 | A | 7/1998 | Covert et al. |
| 6,327,139 | B1 | 12/2001 | Champion et al. |
| 6,356,697 | B1 | 3/2002 | Braga et al. |
| 7,335,056 | B1 | 2/2008 | Clark et al. |
| 7,746,667 | B1 | 6/2010 | Baiza et al. |
| 8,068,715 | B2 | 11/2011 | Kewitsch |
| 8,175,425 | B2 * | 5/2012 | Chen .............................. 385/22 |

(Continued)

FOREIGN PATENT DOCUMENTS

| | | |
|---|---|---|
| EP | 0207926 A2 | 1/1987 |
| EP | 0795935 A2 | 9/1997 |

OTHER PUBLICATIONS

Partial International Search Report for Application No. PCT/US2013/023176 dated May 2, 2013.

(Continued)

*Primary Examiner* — Jean F Duverne
(74) *Attorney, Agent, or Firm* — Lerner, David, Littenberg, Krumholz & Mentlik, LLP

(57) ABSTRACT

A device and a system may facilitate access to communication connectors, adapters, and/or ports that are supported within a housing, e.g., a rack or cabinet. The system may include one or more of the devices, which each include a connection means supporting the connectors, adapters, and/or ports. The system may also include a device that manages, e.g., guides and supports cables that are operatively coupled to the connectors, adapters, and/or ports.

20 Claims, 17 Drawing Sheets

(56) References Cited

U.S. PATENT DOCUMENTS

| | | |
|---|---|---|
| 2002/0117942 A1 | 8/2002 | Audibert et al. |
| 2004/0074852 A1 | 4/2004 | Knudsen et al. |
| 2006/0018622 A1 | 1/2006 | Caveney et al. |
| 2006/0162948 A1 | 7/2006 | Rinderer et al. |
| 2008/0002937 A1 | 1/2008 | Spisany et al. |
| 2009/0078834 A1 | 3/2009 | Chen et al. |
| 2009/0086441 A1 | 4/2009 | Randall et al. |
| 2010/0008623 A2* | 1/2010 | Arol et al. ......... 385/17 |
| 2010/0054659 A1* | 3/2010 | Pnini et al. ......... 385/16 |
| 2010/0310221 A1 | 12/2010 | Le Dissez |
| 2012/0019117 A1 | 1/2012 | Dunwoody et al. |
| 2012/0321255 A1* | 12/2012 | Kewitsch ......... 385/78 |

OTHER PUBLICATIONS

International Search Report for Application No. PCT/US2013/023176 dated Jun. 27, 2013.
International Search Report and Written Opinion for Application No. PCT/US2013/033701 dated Sep. 2, 2013.
Partial International Search Report for Application No. PCT/US2013/033701 dated Jul. 11, 2013.
International Search Report and Written Opinion for Application No. PCT/US2014/021953 dated Jun. 25, 2014.

* cited by examiner

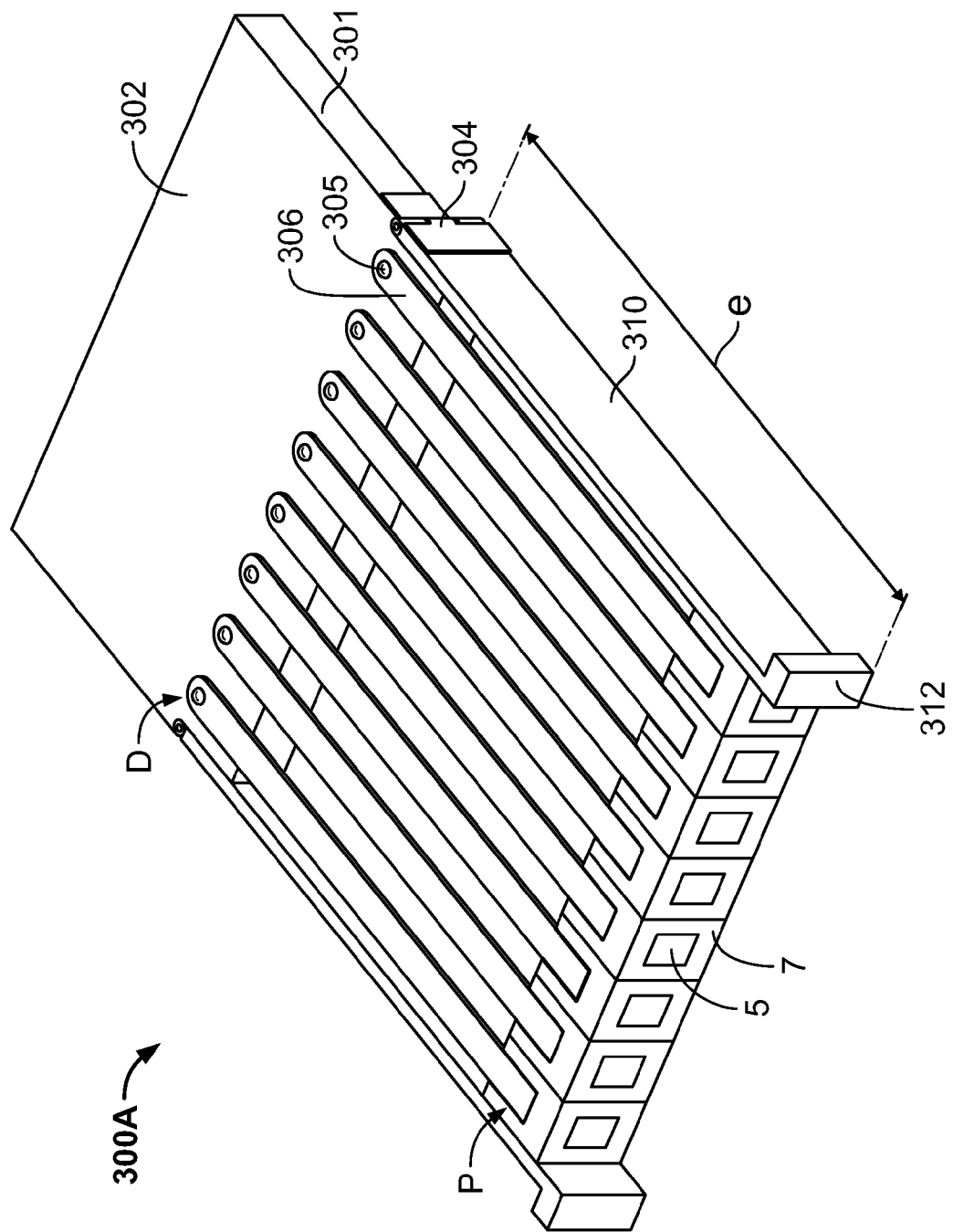

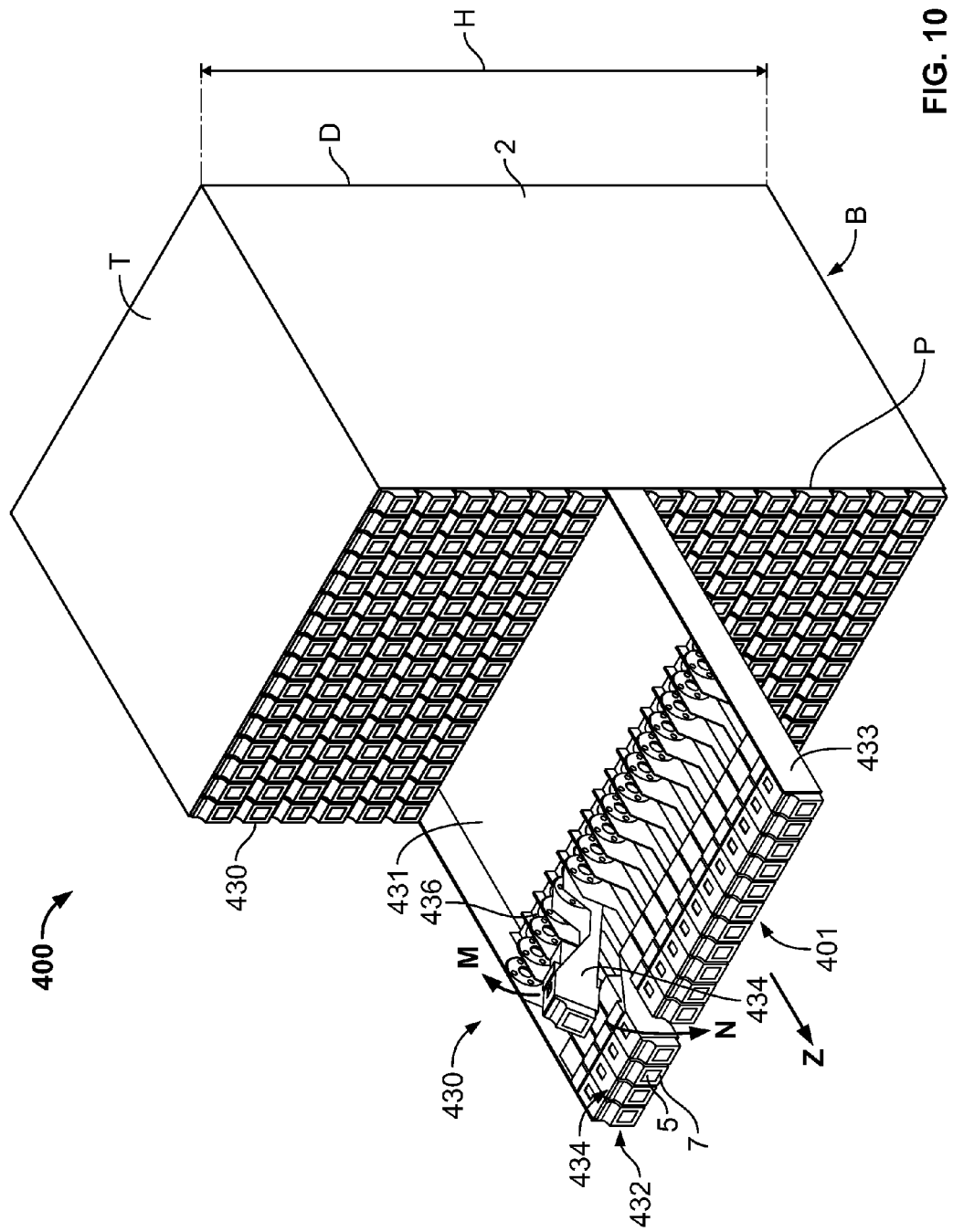

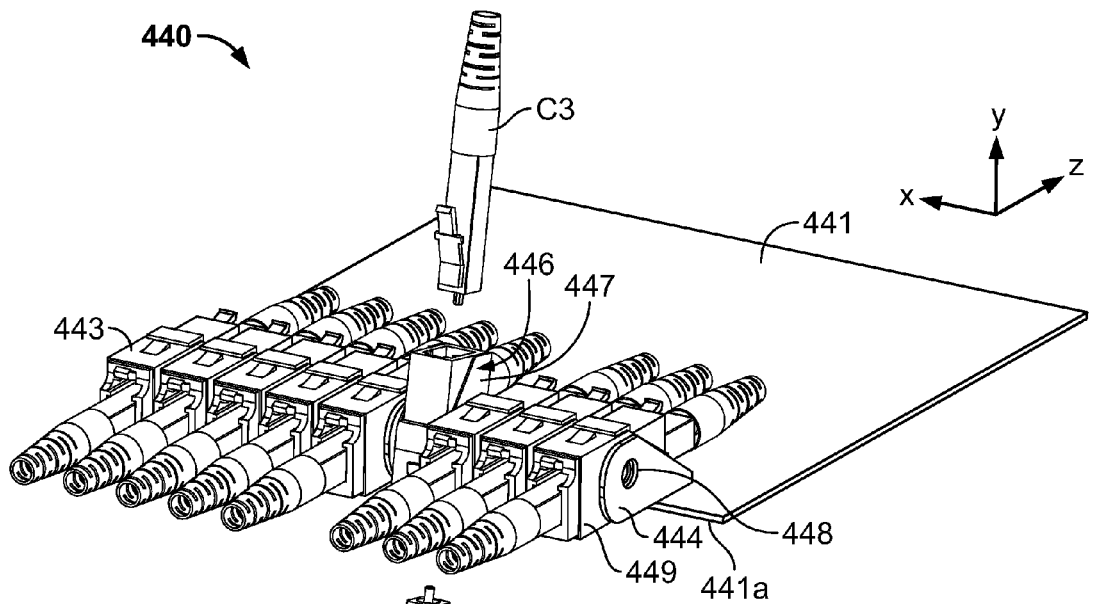
FIG. 14B
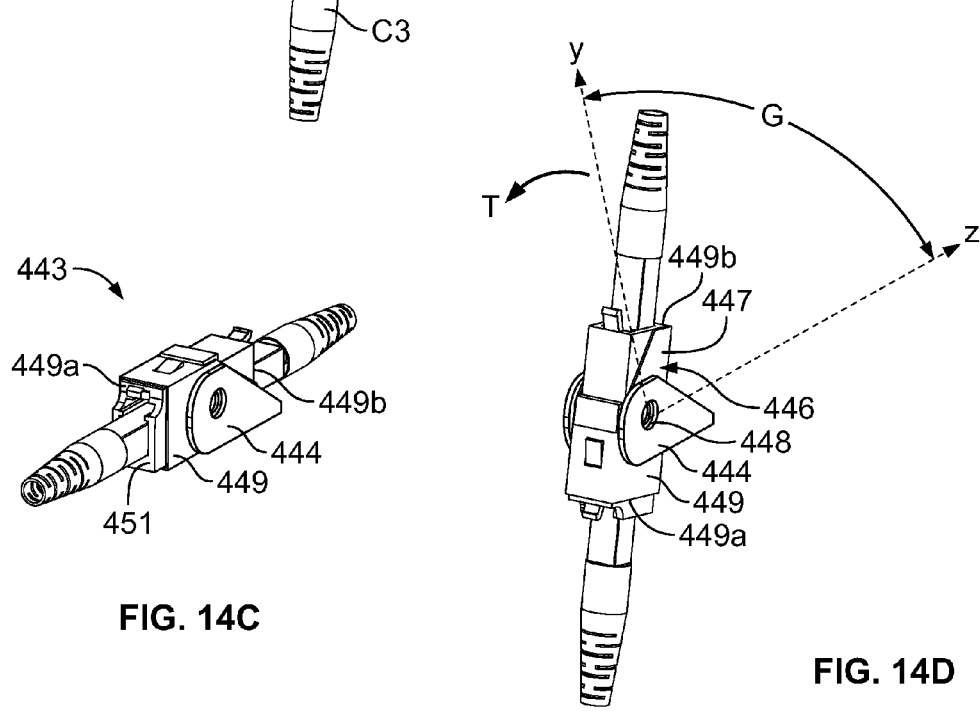
FIG. 14C
FIG. 14D

PATCH PANEL ASSEMBLY

CROSS-REFERENCE TO RELATED APPLICATIONS

The present application claims the benefit of the filing dates of U.S. Provisional Patent Application No. 61/591,714 filed Jan. 27, 2012, U.S. Provisional Patent Application No. 61/598,041 filed Feb. 13, 2012, and U.S. Provisional Patent Application No. 61/666,346 filed Jun. 29, 2012, the disclosures of which are hereby incorporated by reference in their entireties.

BACKGROUND OF THE INVENTION

The present disclosure generally relates to a device and a system for supporting and managing communication connectors, adapters, and/or ports. More particularly, the present disclosure relates to a communication patch panel device and system, which facilitate access to communication connectors, adapters, and/or ports supported by the device and system.

In communications cabinets and racks, a multitude of cables are interconnected to one another through connectors, e.g., adapters. A cable organization unit typically has a tray or a shelf or a similar platform, which supports the connectors, e.g., adapters. Examples of cable organization units include patch panels.

A patch panel houses cable connectors and in the majority of cases is rack mounted. The patch panel typically is two-sided. Typically, the front of the patch panel provides for connections to relatively short cables, and the rear of the patch panel usually provides for connection to relatively long wires or cables. This setup facilitates the performance of temporary alterations to the front of the patch panel without disturbing the connections in the rear. Sometimes, the cables connected to the front of the patch panel may interconnect different patch panels and may be relatively short or may be part of longer cables. The patch panel facilitates interconnecting, monitoring, and circuit testing of equipment without necessitating costly switching equipment.

Early applications for patch panels were for telephone exchanges, where they are still used albeit in a more automated form. Patch panels are also used extensively in the entertainment industry, e.g., in recording and television studios. They are also used in concert halls to manage connections among equipment, e.g., microphones, speakers, and other electronic equipment. Patch panels are valued for such purposes not only for their convenience and relative cost effectiveness, but also because they make it easier to identify problems such as feedback, ground loops, and static.

Traditional fiber optic cable organization units include fiber optic shelves having a single patch panel or multiple modular panels on the front patching side of the shelf. It is desirable to provide patch panels having increased connector port density, i.e., the number of locations or ports per unit volume of area for providing connections. To this end, smaller sized connectors are increasingly being utilized.

A variety of optical fiber connectors are available, with the Subscriber Connector (SC) and the Lucent Connector (LC) being the most common. The differences among the types of connectors include dimensions and methods of mechanical coupling. For instance, SC connectors use a round 2.5 mm ferrule to hold a single fiber and use a push-on/pull-off mating mechanism. The ferrule of an LC connector is half the size as that of an SC connector, measuring only 1.25 mm. LC connectors use a retaining tab mechanism, which is similar to that found on a household phone connector.

In data communication and telecommunication applications, small connectors, e.g., LC, are increasingly replacing traditional connectors, e.g., SC. The main advantage of small connectors over larger sized connectors is the ability to provide a higher number of fibers per unit of rack space. Since the LC connector is roughly half the size as the SC connector, the placement of almost twice the number of connectors is possible within the same amount of space by using the LC connector instead of the SC connector.

However, there are disadvantages associated with using smaller connectors. As more connectors are placed within the same amount of space, accessing the connectors which is often performed by hand may present a challenge. Adult fingers typically have a diameter of 16 mm to 20 mm. Some people may have larger or misshapen fingers. Therefore, the use of small connectors, such as the LC having a 1.25 mm diameter ferrule, may be especially problematic for technicians having larger or less dexterous hands. Commonly, LC connectors are held together in a duplex configuration with a plastic clip. While holding smaller sized connectors in a duplex configuration may make it easier for a technician to access and/or remove LC connectors, it also means that two connectors are necessarily affected by any given servicing procedure.

There is a continuing need for new devices and systems to facilitate access communication adapters and/or cables supported by communication patching devices and systems.

BRIEF SUMMARY OF THE INVENTION

The present disclosure is generally related to a communication patch panel and a communication patching system. In particular, the present disclosure is related to a patch panel that facilitates both the placement of multiple, relatively small connectors in close proximity to each other and the manipulation and/or maintenance of those connectors.

In an embodiment, a communication patch panel device may include a plurality of ports that are each operably connectable to a cable. A connection means may be connected to the plurality of ports. The connection means may be transitionable between a first state and a second state. In the first state, the connection means may have a first length along which the ports are positionable. In the second state, the connection means may have a second length in which the ports are positionable. The second length may exceed the first length. In the first state, adjacent ones of the ports may be spaced apart a first distance. In the second state, adjacent ones of the ports may be positionable to be spaced apart a second distance, which exceeds the first distance. In the second state, the ports may be positioned equidistance from one another. The connection means may include a resilient element that positions the ports at a predetermined spacing from one another when the patch panel is in the second state.

The connection means may include one or more rails that are slidable relative to one another to define the first length, the second length, and intermediate lengths therebetween. The one or more rails may be coupled to the plurality of ports to define a distance between the ports. Slidable movement of the one or more rails relative to one another may adjust the distance between the ports to transition the connection means amongst the first, second, and intermediate lengths. The connection means may include a bar having an adjustable length transitionable among a first length, a second length, and intermediate lengths therebetween. The bar may be coupled to the plurality of ports to define a gap distance between adjacent ones of the plurality of ports, which corresponds to the adjustable length of the bar. The connection means may include a tray and a plurality of arms including a first portion and a second portion. The first portion of each arm may be pivotably coupled to the tray. The second portion of each arm may be operatively coupled to one of the plurality of ports, and pivoting of the arms may effect transitioning of the connection means between the first and second states.

In an embodiment, a communication patch panel device may include a plurality of attachment members. Each attachment member may include a movable member having a connector having a front surface. The movable members may be movable relative to one another to transition the communication patch panel device between a first condition in which the front surfaces are substantially coplanar and a second condition in which the front surfaces are in different respective planes. The connector may be separable from the movable member. The connector may be configured to be releasably coupled to a first cable at the front surface. The connector may further include a back surface, which may be configured to be releasably coupled to a second cable. The movable members may be rotatable relative to one another. The patch panel device may further include a tray defining a surface and at least one securement member coupling the attachment members to the tray. The movable member may define an angle with respect to the surface of the tray, and the angle may be adjustable. In an embodiment, the angle may be adjusted to be between 0 and 135 degrees, and in a more particular embodiment, the angle may be adjusted to be between 0 and 90 degrees.

The communication patch panel devices described above may be configured to be supported by a housing. The housing may include a front face, and the panel may be movable away from the front face to transition from the first state to the second state when supported by the housing. In an embodiment, a communication patch panel device may include a tray having a length that is configured to be translatable into and out from a housing.

In an embodiment, a communication patch panel system may include a housing including a front end and a back end, a patch panel device including a tray that is movable along an axis extending from the front end to the back end of the housing, and a cable tensioner. The cable tensioner may include a first end that is secured relative to the housing and a second end that is secured to the tray. The cable tensioner may be formed from a compliant or bendable material. The cable tensioner may be transitionable between a first state and a second state in which a portion of the tensioner has a greater radius of curvature than in the first state in response to translation of the tray between the front and back ends of the housing.

These and other features of the present disclosure will be more fully described with reference to the accompanying figures.

BRIEF DESCRIPTION OF THE DRAWINGS

By way of description only, embodiments of the present disclosure will be described herein with reference to the accompanying drawings, in which:

FIG. 8A is a perspective view of a still further embodiment of a patch panel device shown in a first state;

FIG. 10 is a front perspective view of a communication patching system including multiple patch panel devices;

FIG. 14B is a perspective view of the patch panel device of FIG. 14A in which cables have been separated from one of the attachment members;

FIG. 14C is a perspective view of one of the attachment members of FIG. 14A shown in a first condition;

FIG. 14D is a perspective view of one of the attachment members of FIG. 14A shown in a second condition;

DETAILED DESCRIPTION

Figure 1A:
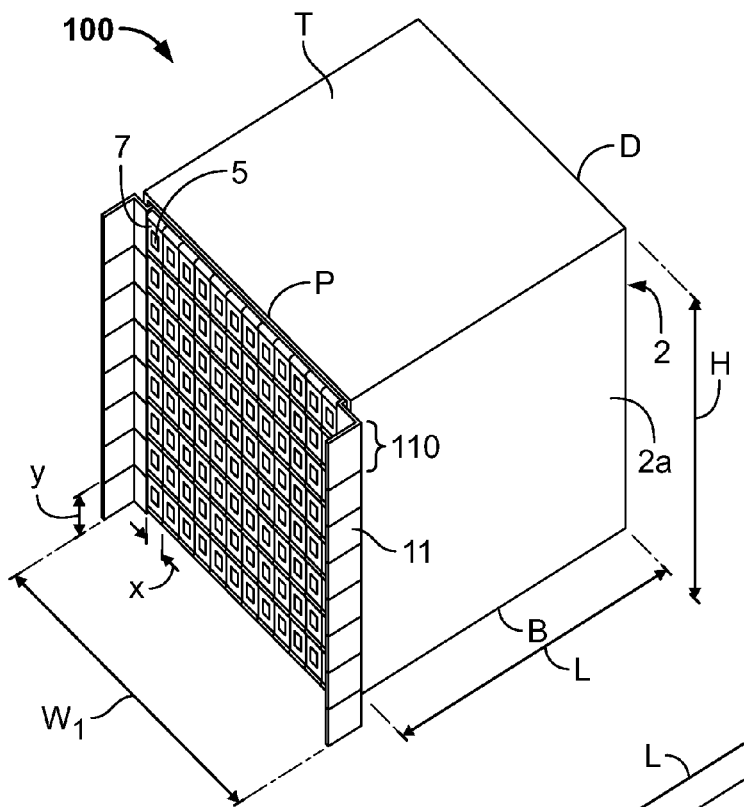
FIG. 1A is a front perspective view of a communication patching system including multiple patch panel devices shown in a first state.

Particular embodiments of the present disclosure will be described with reference to the accompanying drawings. In the figures and in the description that follow, in which like reference numerals identify similar or identical elements, the term "proximal" will refer to the end of the device that is closest to the operator or user during use, while the term "distal" will refer to the end of the device that is farther from the operator or user during use.

A communication patching system 100 will now be described with reference to FIGS. 1A and 1B. The communication patching system 100 includes a housing 2, e.g., a rack or a cabinet. The housing 2 supports one or more patch panel devices 110. The housing 2 defines a length L, a height H, and a width $W_1$. Each patch panel device 110 includes a plurality of adapters or ports 7, each port 7 having a receptacle 5 for securing a cable C (FIG. 1B) therein. The receptacle 5 of the port 7 may be operatively coupled to one or more cables C, e.g., the receptacle 5 may be in a simplex or in a duplex configuration. The port 7 may include a mounting portion 51 that frames the port 7 and facilitates securing of the port 7, or the receptacle 5, to connection means, e.g., rails 41, 43 (FIG. 2C). In embodiments, the mounting portion 51 of the port 7 may be integrally formed with the port 7 or may be a separate component coupled to the receptacle 5, and in some embodiments the mounting portion may form a part of a connection means to which the receptacle 5 is connected, as described below.

The patch panel device 110 includes a tab 11 on either end of the patch panel device 110 to facilitate a user's grasping or handling of the patch panel device 110. The density of the number of ports 7 supported by the housing 2 is a function of the dimensions of the housing 2. As shown in FIG. 1A, the ports 7, each of which has a width x and a height y, may be arranged in rows and columns in which the number of rows of ports 7 is directly correlated to the height H and the number of columns of ports 7 is directly correlated to the width $W_1$.

Figure 1B:
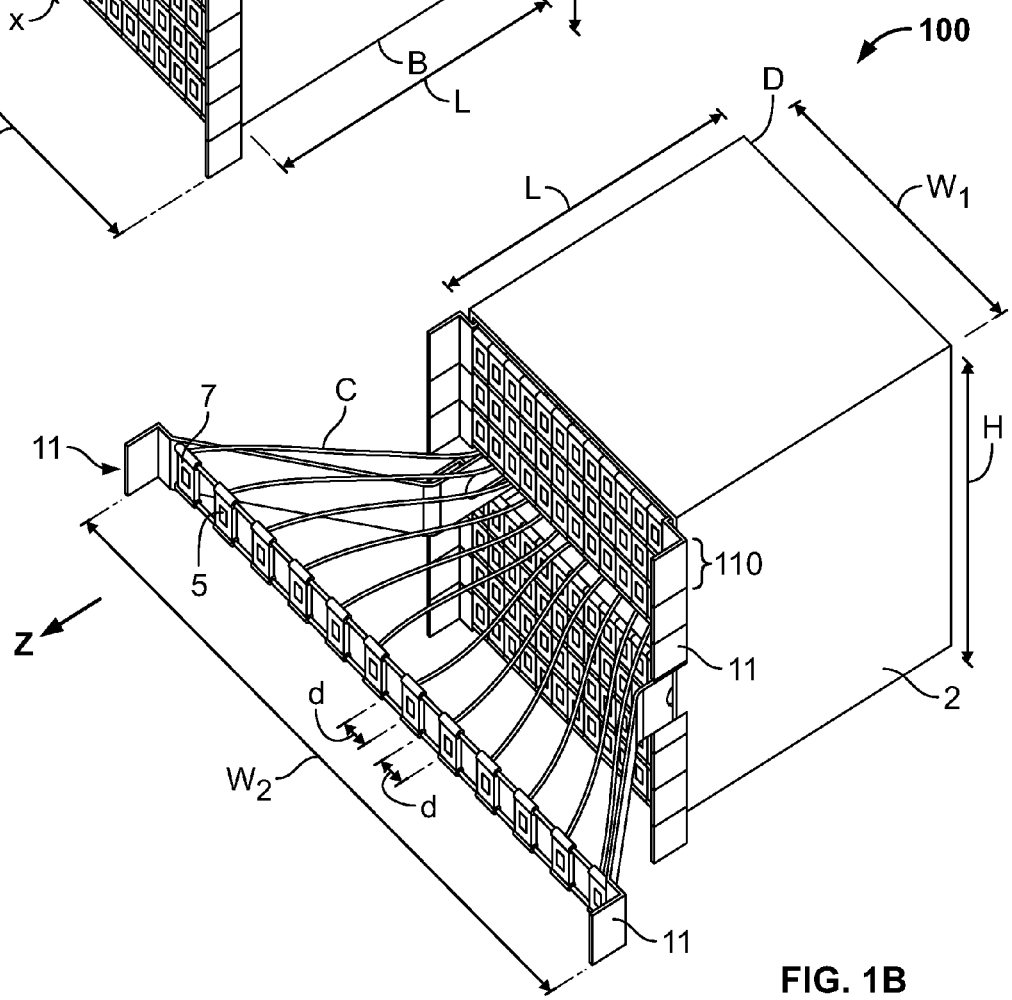
FIG. 1B is the communication patching system of FIG. 2 shown in a second state.

The communication patching system 100 is transitionable between a first state (FIG. 1A) and a second state (FIG. 1B). In the first state, the one or more patch panel devices 110 are in positioned at a first location with respect to the proximal end or face P of the housing 2. As shown in FIG. 1A, the patch panel devices 110 may be substantially flush with respect to the face P of the housing 2. In the second state, one or more of the patch panel devices 110 is moved proximally in the direction of directional arrow Z away from the proximal end or face P of the housing 2. As the patch panel device 110 is moved proximally, the ports 7 may be positionable to be spaced apart from one another by a gap or spacing distance d (FIG. 1B).

Figure 2A:
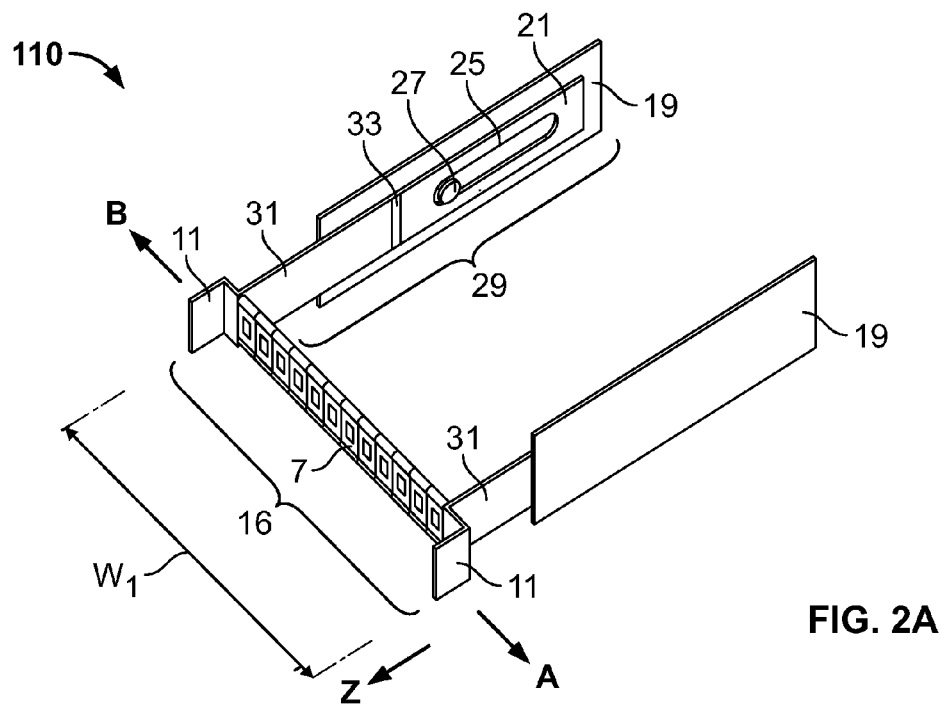
FIG. 2A is one of the patch panel devices of FIG. 1 shown in a first state.
Figure 2B:
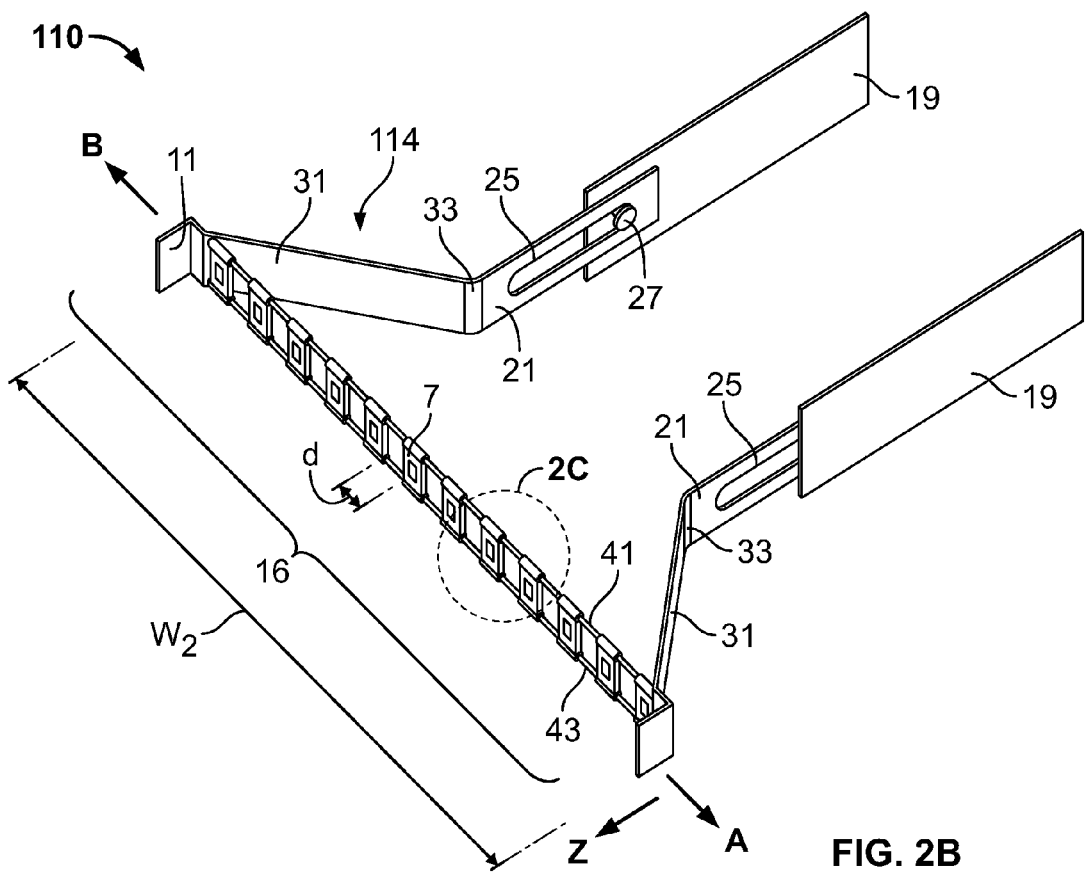
FIG. 2B is the patch panel device of FIG. 2A shown in a second state.
Figure 2C:
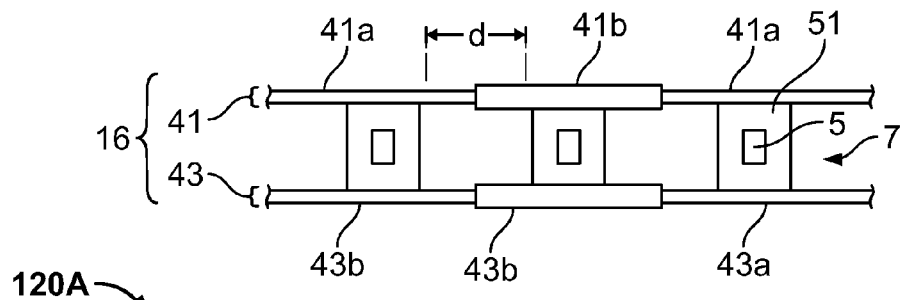
FIG. 2C is an enlarged view of the indicated area of FIG. 2B.

The patch panel device 110 is transitionable between first and second states, as shown best in FIGS. 2A and 2B respectively. The patch panel device 110 includes bars 19, which facilitate mounting of the patch panel device within the housing 2 by securing one of the bars 19 on each of opposite sides 2a of the housing 2. A hinged arm member 114, which includes a first arm section 21 and a second arm section 31, is slidably connected to the bar 19. The first arm section 21 includes a slot 25 which is configured and adapted to receive a pin 27 therethrough. The pin 27 secures the first arm section 21 to the bar 19 while permitting the first arm section 21 to slide relative to the bar 19 along the length of slot 25. The first arm section 21 and the second arm section of the hinged arm 114 are pivotably connected to one another by a hinge 33, thereby facilitating the rotation of the second arm section 31 relative to the first arm section 21.

The ports 7 may be operably coupled to a connection means 16. As the connection means 16 transitions from a first length equal to width $W_1$ (FIG. 2A) to a second, expanded width $W_2$ (FIG. 2B), the ports 7 may move, or be moveable, to be positioned spaced apart. In an embodiment, the ports 7 are spaced apart. The ports 7 may be equidistantly spaced apart by equal gaps or spacing distances d. However, the spacing distances d between adjacent ports 7 may differ, i.e., be non-uniform, in the second state. In addition, individual ports 7 may be slid or moved along the length of the connection means 16, thereby facilitating adjusting the gap or spacing distances d between adjacent ports 7 as desired by the user or technician.

It is contemplated that the hinged arm member 114 may include a lip (not shown) that interacts with a groove (not shown) defined within the bar 19 along a portion or substantially the entire length of the bar 19 to provide added stability and controlled movement of the hinged arm member 114 relative to the bar 19.

As shown best in FIG. 2C, the connection means 16 may include one or more telescopic rails 41, 43 that are slidable with respect to each other to adjust the overall length of the connection means 16. Although shown in FIG. 2C as having two parallel rails 41, 43, a single rail may be used. It should be noted that the greater the overall length of the connection means 16, the greater the gap or spacing distance d achievable between adjacent ports 7. Each of the parallel rails 41, 43 includes alternating sections 41a, 41b and 43a, 43b respectively. Sections 41a, 43a are configured and adapted to slide within sections 41b, 43b respectively, where the ports 7 are coupled to the sections 41b, 43b, to effect lengthening or shortening of the connections means 16. A resilient or biasing member (not shown) may be placed within a hollowed out center of each of the rails 41, 43 to bias the connections means 16 to one of the first or second dimensions $W_1$, $W_2$, respectively.

The sections 41b, 43b may define an open circumference such the ports 7 will not obstruct movement of the alternating sections 41a, 41b and 43a, 43b relative to one another such that the ports 7 may be moved in closer proximity to one another. In addition, the lengths of the alternating sections 41a, 41b and 43a, 43b may be selected to facilitate placement the ports 7 in close proximity to one another, such that adjacent ports contact each other. Each port 7 may be secured to the rails 41, 43 in a variety of ways or may be integrally formed with the rails 41, 43. It is contemplated that in other embodiments, the rails 41, 43 may be substituted with different connection means. In an embodiment, the rails 41, 43 may be substituted with elastic bands.

Figure 3A:
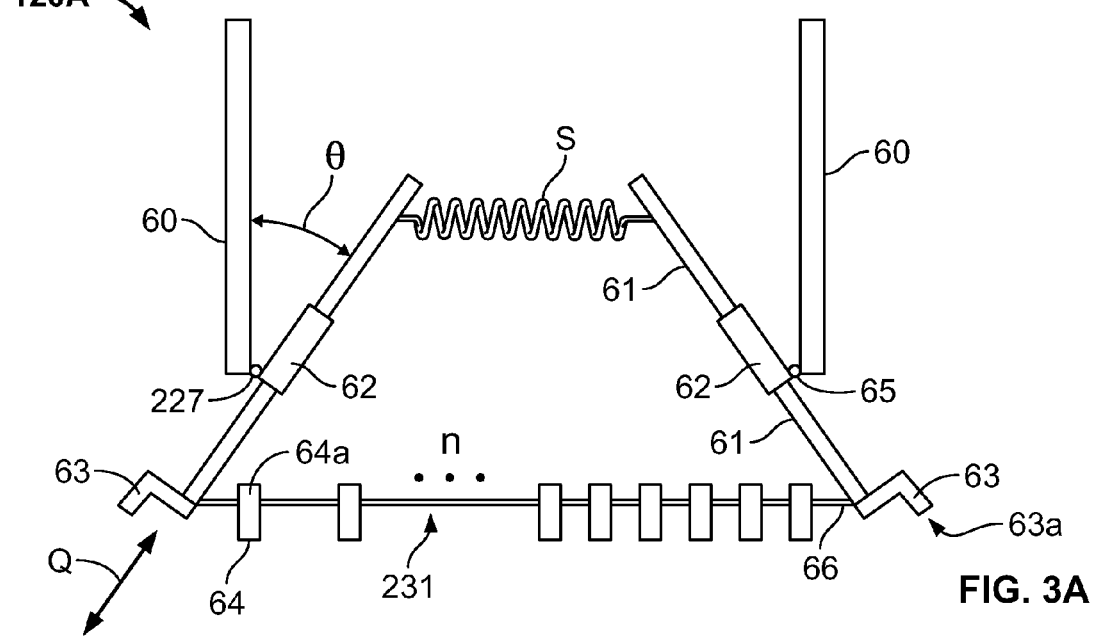
FIG. 3A is a top view of another embodiment of a patch panel device.

Another embodiment of a patch panel device will now be described with respect to FIG. 3A. A patch panel device 120A may include bars 60 that are mountable within the housing 2 described above with respect to communication patching system 100. A sleeve 62 is pivotably connected by a hinge 227 to each of the bars 60 such that the sleeve is angularly movable with respect to the bar 60, thereby facilitating angling of the sleeve 62 with respect to the bar by an angle θ. An arm member 61 is slidably translatable through each sleeve 62 in the directions of directional arrows Q. Both distal translation of the arm member 61 outward from the sleeve 62 and an increase in an angle θ between the sleeve and the corresponding bar 60 result in a lengthening of connection means 231. The connection means 231 may be a resilient member that will stretch in response to an increase in the separation between distal ends 63a of the arm members 61 with respect to each other. Tabs 63 at the distal ends 63a of the arm members 61 may facilitate a user or technician gripping the arm members 61 and effecting both the angular and axial movement of the arm members 61. Disposed along and connected or coupled to the connection means 231 are n number of ports 64 that are each configured and adapted to receive a suitable connector and/or cable. A channel 64a may be defined within each of the ports 64, to receive the connection means therein and facilitate sliding of the ports 64 along the length of the connection means. A resilient or biasing member S, e.g., a spring, may be positioned at the distal end of each of the arm members 61, thereby effecting or causing transitioning of the connection means 231 to an expanded state upon sliding the arm members 61 proximally through the sleeves 62.

Figure 3B:
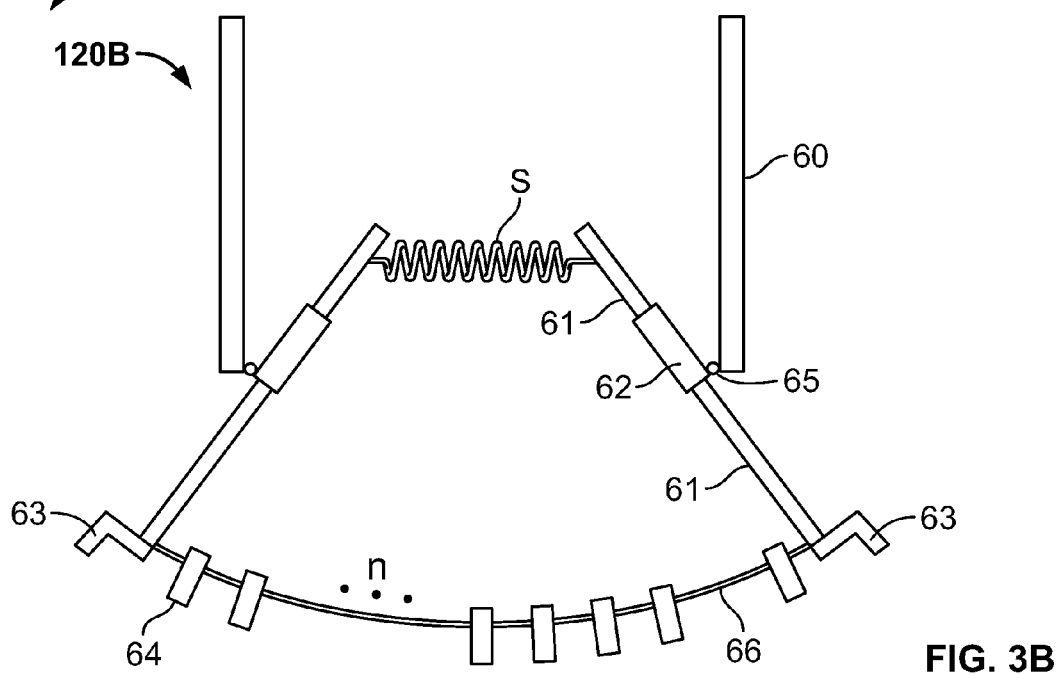
FIG. 3B is a top view of yet another embodiment of a patch panel device.

As shown in FIG. 3B, a patch panel device 120B is substantially similar to the patch panel device 120A and includes all of the features of the patch panel device 120A with the following exception. Instead of connection means 231, which is shown as defining a generally straight shape, a connection means 66 is used that defines a generally arcuate shape.

Figure 4:
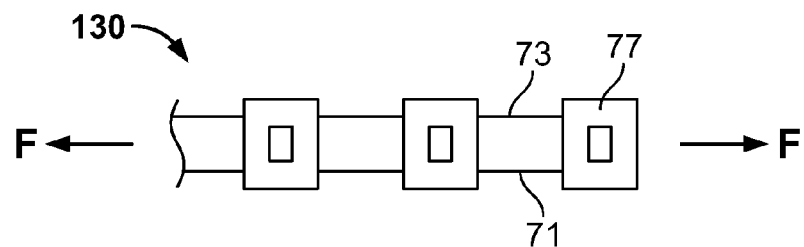
FIG. 4 is a front view of a portion of an embodiment of a patch panel device.

Other embodiments of a connection means will now be described with reference to FIGS. 4-6A. As shown in FIG. 4, a patch panel device 130 includes ports 77 that are operably connected to one another by one or more resilient members or bands 71, 73, thereby facilitating a stretching of the bands 71, 73 and a corresponding increase in the spacing or gaps between the ports 77 upon application of a force as indicated by the directional arrows F.

Figure 5:
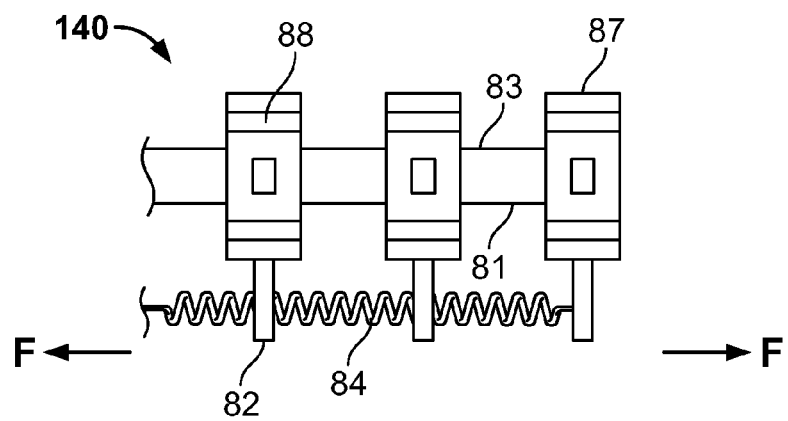
FIG. 5 is a front view of a portion of another embodiment of a patch panel device.

As shown in FIG. 5, a patch panel device 140 may include a plurality of ports 87 slidable with respect to one another along one or more rails 81, 83 that are receivable within channels 88 that extend through the width of each port 87. Each port 87 includes a post 82 that is operably coupled to a resilient member 84, e.g., a spring, which extends the length of the connection means 140. The resilient member 84 uniformly stretches upon the application of a force as indicated by the directional arrows F, thereby facilitating equidistant spacing of the ports 87 with respect to one another. In this embodiment, the rails 81, 83, in combination with the channels 88 and posts 82 which correspond to mounting portions of the ports 87, and the resilient member 84 form the connection means.

Figure 6:
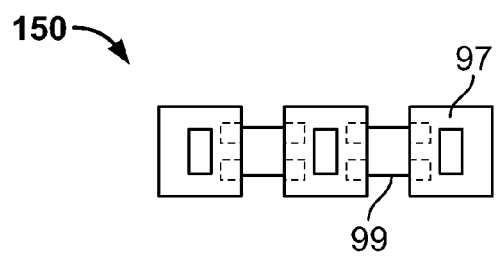
FIG. 6 is a front view of a portion of yet another embodiment of a patch panel device including multiple ports.
Figure 6A:
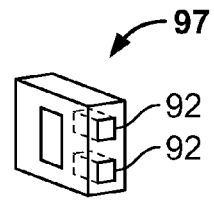
FIG. 6A is a perspective view of one of the ports of FIG. 6.

As shown in FIGS. 6 and 6A, a patch panel device 150 may include a plurality of ports 97 including one or more bars 99 that are receivable within slots or grooves 92 defined within each port 97. The bars 99 secure and stabilize the ports 97 with respect to one another. In this embodiment, the bars 99 and the grooves 92, which correspond to mounting portions of the ports 97, form the connection means. In operation, as the ports 97 are moved toward one another, the bars 99 are received within the slots 92; as the ports 97 are moved apart from one another, the bars 99 are withdrawn from within the slots 92.

Figure 7A:
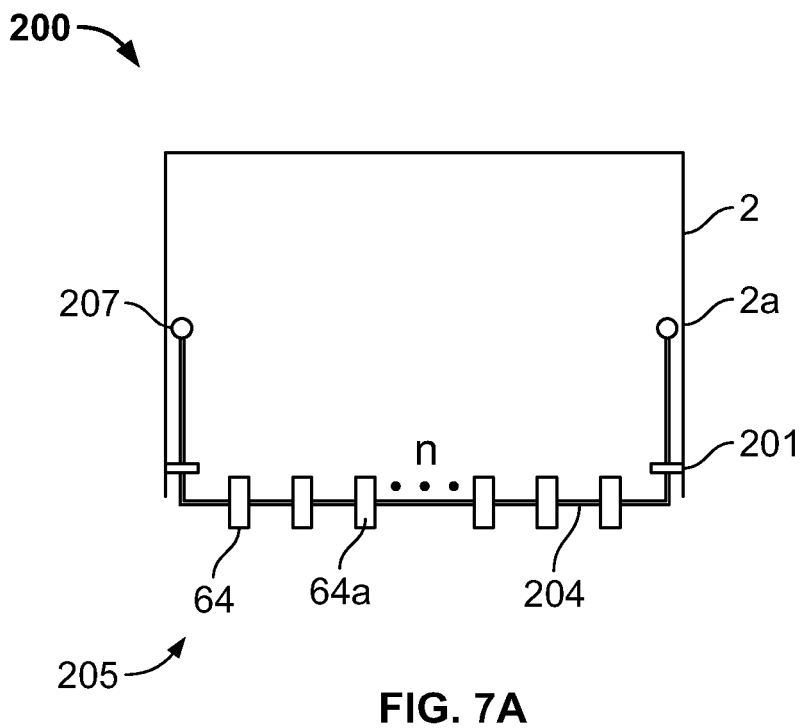
FIG. 7A is a top view of a patch panel device shown in a first state.
Figure 7B:
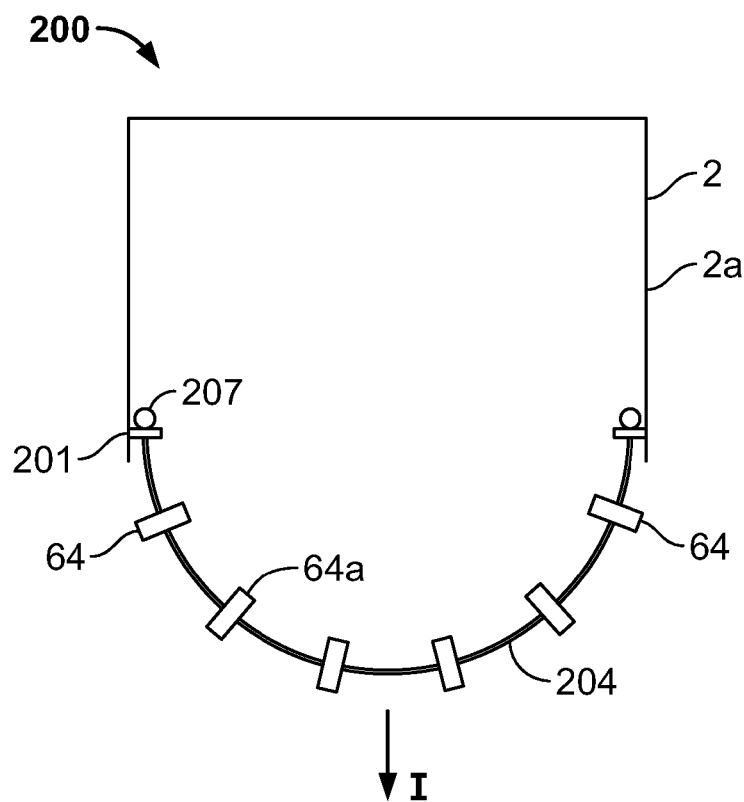
FIG. 7B is a top view of the patch panel device of FIG. 7A shown in a second state.

Another embodiment of a communication patching system will now be described with respect to FIGS. 7A and 7B. A communication patching system 200 includes the housing 2 and one or more patch panel devices 205 supported therein. The patch panel device 205 includes a flexible member 204, e.g., a bar made from a shape memory material such as nickel titanium. The flexible member 204 is received within channels 64a of the ports 64 such that the ports 64 are slidable along the length of the flexible member 204. The channel 64a of each port 64 may frictionally engage the flexible member 204 such that the port 64 moves in response to being moved by a user or technician, but does not move unintentionally. Holders 201 secure the flexible member 204 to the sides 2a of the housing 2. A bulbous region 207 of the flexible member 204 inhibits the complete withdrawal of the flexible member 204 from the housing 2. As the flexible member 204 is moved in the direction indicated by arrow I, the flexible member 204 bows outward from a generally straight shape to an arcuate shape. The bowing out of the flexible member 204 results in a greater length along which the ports 64 may slide with respect to the flexible member 204, thereby facilitating increased spacing between adjacent ports 64.

Figure 8B:
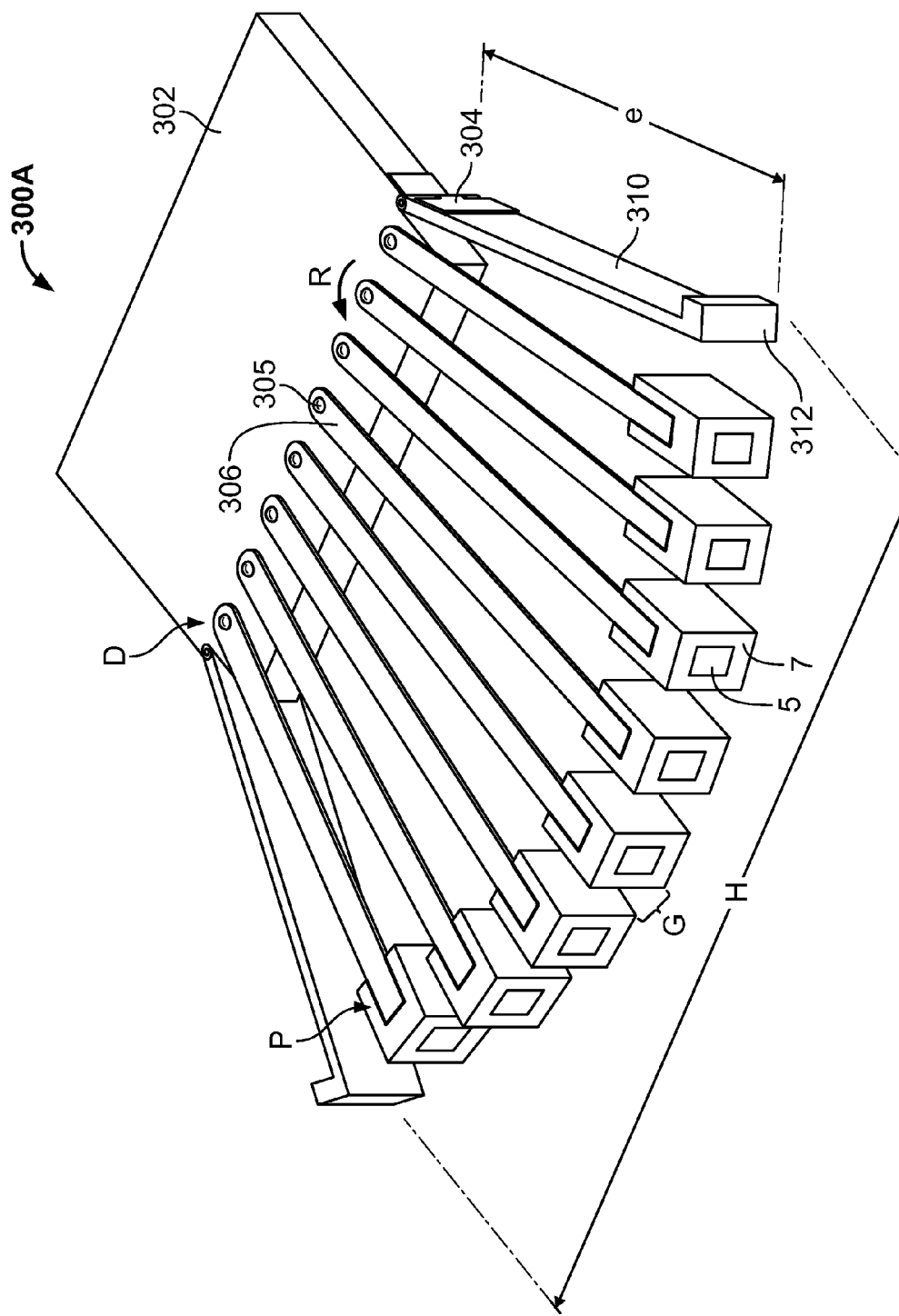
FIG. 8B is a perspective view of the patch panel device of FIG. 8A shown in a second state.

Another embodiment of a patch panel device will now be described with reference to FIGS. 8A and 8B. A patch panel device 300A includes a connection means transitionable between a first state (FIG. 8A) and a second state (FIG. 8B). The patch panel device 300A includes a tray 302 and a plurality of arms 306 that are each operatively coupled in a pivotable relationship with the tray 302. Each arm 306 is operably coupled to a port 7 including a receptacle 5 at a proximal end P of the arm 306. A pin 305 may pivotably connect the distal end D of each arm 306 to the tray 302. The tray 302 may be slidably received within a housing, e.g., housing 2 (FIG. 1A), such that the patch panel device 300A is translatable in a direction toward or away from the distal end or D of the housing 2. Bars 310 may facilitate the translation of the tray 302 with respect to the housing 2. The bars 310 are pivotably coupled to opposing sides 301 of the tray 302. Translation of tray 302 a distance e corresponding to the length of the bar 310 away from the housing 2 facilitates pivoting of the bars 310 by minimizing the interaction between the bar 310 and the housing 2 that may otherwise impede such movement. Each bar 310 includes a tab 312 that facilitates a user grasping the bar 310 and translating the tray 302 in a proximal or distal direction. Proximal translation of the tray 302 away from the housing 2 results in the ports 7 being laterally spaced from the face P of the housing 2. Proximal translation of the tray 302 by a distance corresponding to the length e of the bar 310 allows each of the opposing bars 310 to pivot outwardly thereby increasing the distance H between proximal ends of the opposing bars 310. The bars 310 may include tabs 312 to facilitate gripping or grasping of the patch panel device 300A by the user. By increasing the distance H between the proximal ends of the bars 310, the ports 7 may be spaced apart by a greater gap distance G. Repositioning of the ports 7 with respect to one another such that a desired gap distance G between ports 7 is achieved is accomplished by rotating the arms 306 about pin 305 in or opposite to the direction indicated by arrow R. In this embodiment, the connection means may include at least the arms 306, the bars 310, the pins 305 and the ports 7, and optionally the tabs 312.

Figure 9A:
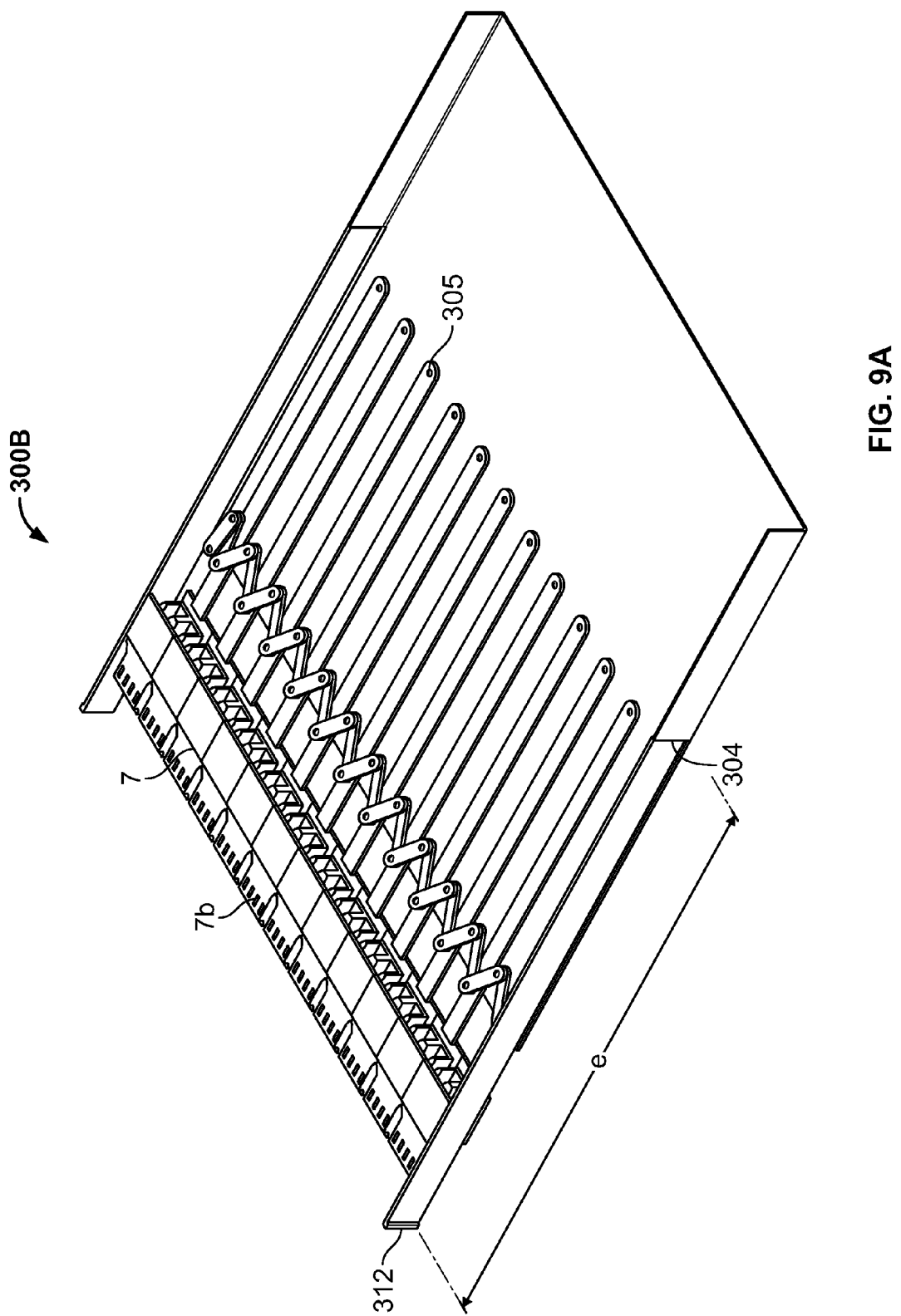
FIG. 9A is a perspective view of yet another embodiment of a patch panel device shown in a first state.
Figure 9B:
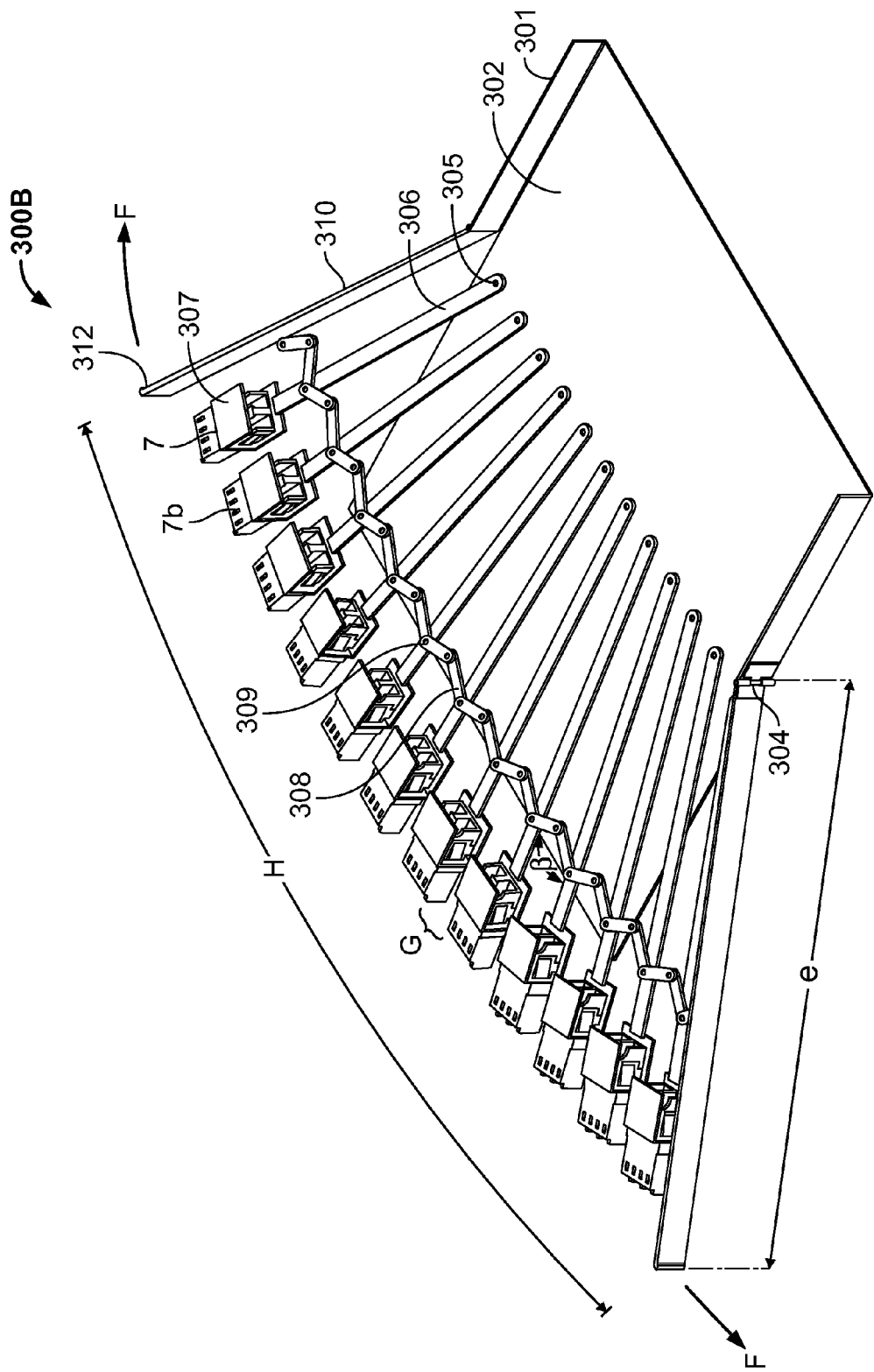
FIG. 9B is a perspective view of the patch panel device of FIG. 9A shown in a second state.

A further embodiment of a patch panel device will now be described with reference to FIGS. 9A and 9B. A patch panel device 300B includes a connection means transitionable between a first state (FIG. 9A) and a second state (FIG. 9B). In the first state, adjacent ports 7 are substantially in close proximity to one another, e.g., touching. In the second state, the adjacent ports 7 have a gap distance G between one another. The patch panel device 300B includes tray 302 and a plurality of pivotable arms 306 that are operatively coupled to the tray 302. Each arm 306 is operatively coupled to a port 7 including a receptacle 5. The arms 306 are radially separable in a fan-like configuration such that gap distance G between the arms 306 is adjustable. A connector 7b, e.g., a simplex or duplex connector, may be positioned within the receptacle 5. The arms 306 are operatively coupled to one another, as well as to bars 310, by links 308 that are joined to each other by pins 309. As the bars 310 are spread apart by applying a force in the directions indicated by directional arrows F, thereby increasing the distance H between the bars 310, the angle β between the links 308 is increased and the gap distance G between adjacent ports 7 is also increased. In an embodiment, by pulling the bars 310 apart from one another in the directions indicated by directional arrows F, the gap distance G between each arm 306 may be substantially equal. To collapse the array of arms 306 and transition the patch panel device 300B back to the first state (FIG. 9A), a force in a direction opposite to that indicated by directional arrows F may be applied such that the interaction between the bars 310 and arms 306 results in transitioning of the patch panel device 300B to the collapsed, first state, thereby allowing the patch panel device 300B to be placed within a housing, e.g., housing 2. In this embodiment, the connection means may include at least the arms 306, the bars 310, the pins 305 and the ports 7, the links 308, the pins 909, and optionally the tabs 312.

A communication patching system 400 is described with reference to FIGS. 10-13. As shown in FIG. 10, the communication patching system 400 includes housing 2, which supports one or more patch panel devices 430. The patch panel device 430 is translatable in or opposite to a direction indicated by arrow Z, e.g., slidable into and out from the housing 2. The patch panel device 430 may include a tray 431 including sidebars 433 to facilitate stabilization and guidance of the patch panel device 430. A plurality of attachment members 432, which are each configured and adapted to be operatively coupled to cables C, are secured to the tray 431.

The attachment member 432 may include a second section 436 attached to a first section 434 by a hinge 441 that facilitates radial movement of the first section 434 relative to the second section 436 in the directions indicated by arrows M and N. Port 7 is releasably securable to the first section 434. In an embodiment, the first section 434 includes a window 443 and the port 7 includes a tab 441 configured and adapted to engage the window 443 to releasably secure the port 7 to the first section 434.

In an embodiment, one of the first and second sections 434, 436 may include a ridge or a bump 438a that is engageable with a groove or dent 438b within the other of the first and second sections 434, 436 such that the first and second sections 434, 436 are positionable relative to one another in a plurality of positions corresponding to the number of pairs of bumps 438a and grooves 438b.

Figure 12A:
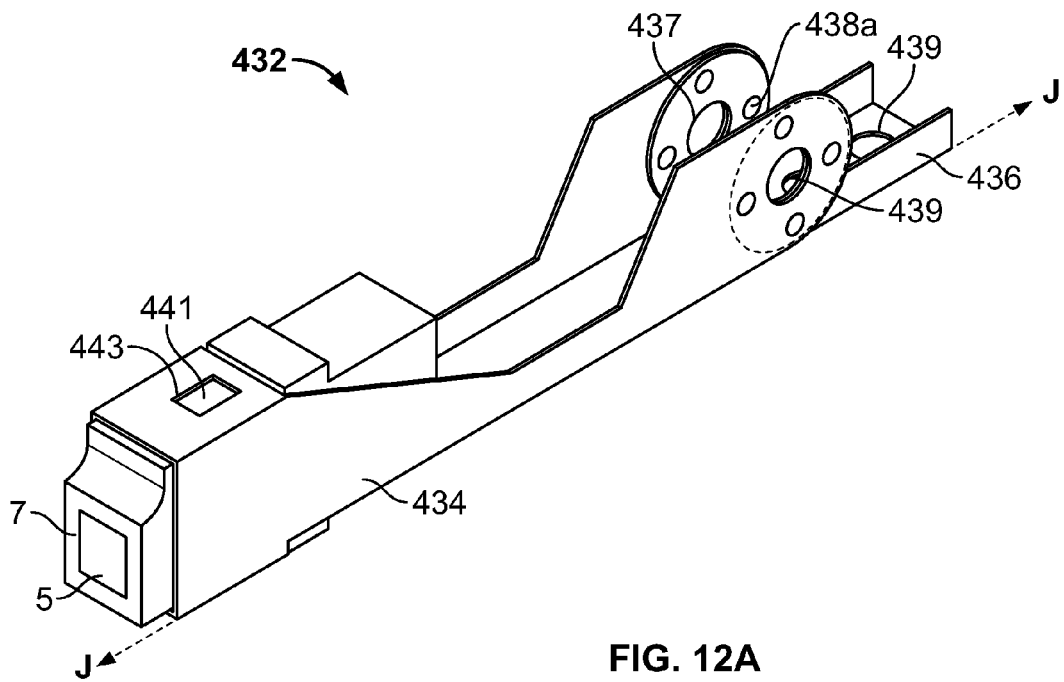
FIG. 12A is a view of one of the attachment members of FIG. 11 shown in a first state.
Figure 12B:
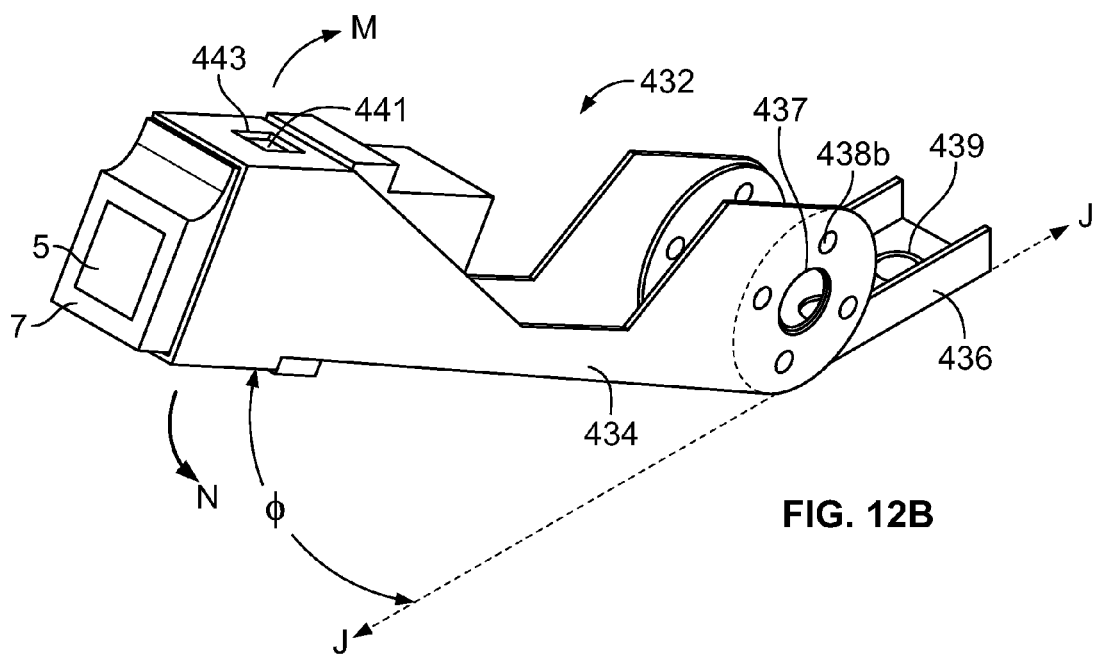
FIG. 12B is a view of the attachment member of FIG. 12A shown in a second state.

As shown in FIGS. 12A and 12B, the attachment members 432 include the first and second sections 434, 436, and are transitionable between a first state in which the first and second sections 434, 436 are substantially aligned along common axis J (FIG. 12A) and a second state in which the first and second sections 434, 436 are bent with respect to one another such that the first section 434 defines an angle $\phi$ with respect to axis J, which extends along the length of the second section 436. The first and second sections 434, 436 may be disposed to be contacting each other in a frictional relationship, so as to inhibit inadvertent repositioning of the first and second sections 434, 436 with respect to each other.

Figure 13:
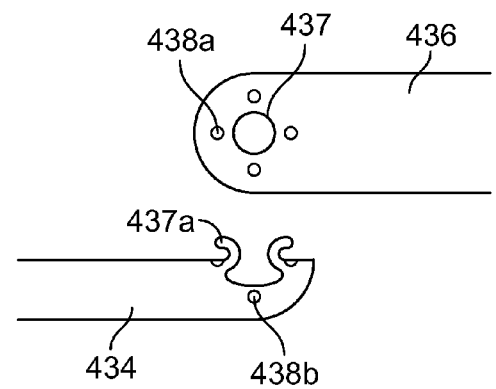
FIG. 13 is a partial view of the attachment member of FIG. 12A with parts shown separated.
Figure 14A:
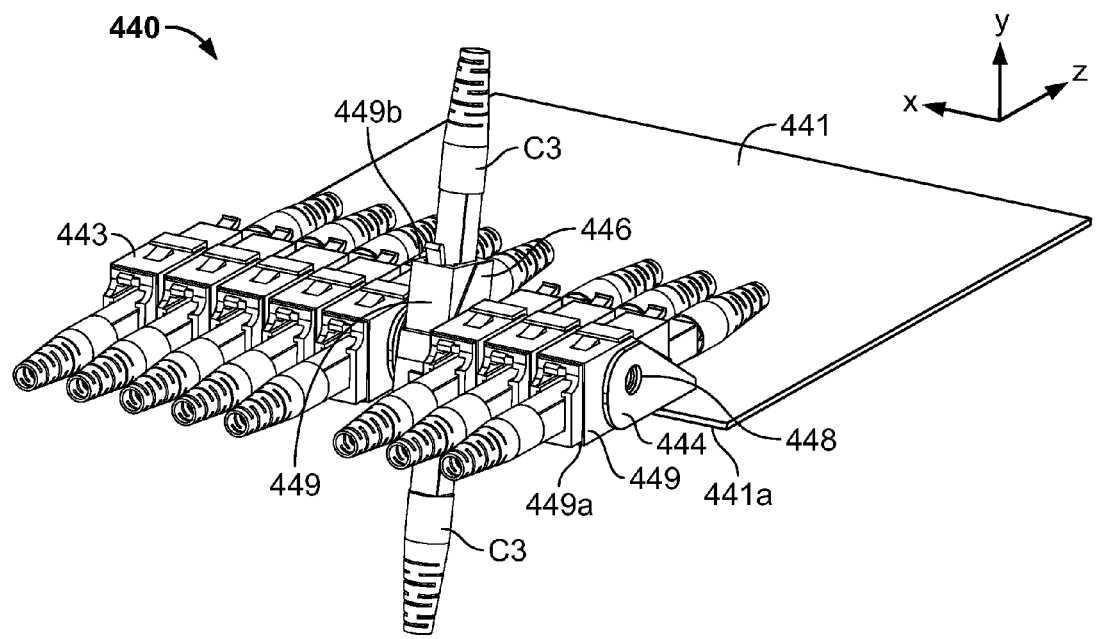
FIG. 14A is a perspective view of another embodiment of a patch panel device including a plurality of attachment members.

In an embodiment, as shown in FIG. 13, the first and second sections 434, 436 are configured to engage each other in a grommet-like relationship to inhibit separation of the first and second sections 434, 436. The first section 434 may include a lip 437a, which is configured to engage an aperture 437, i.e., the lip 437a substantially follows along and contacts the perimeter of the aperture 437, of the second section 436 to inhibit separation of the first section 434 from the second section 436.

Figure 11:
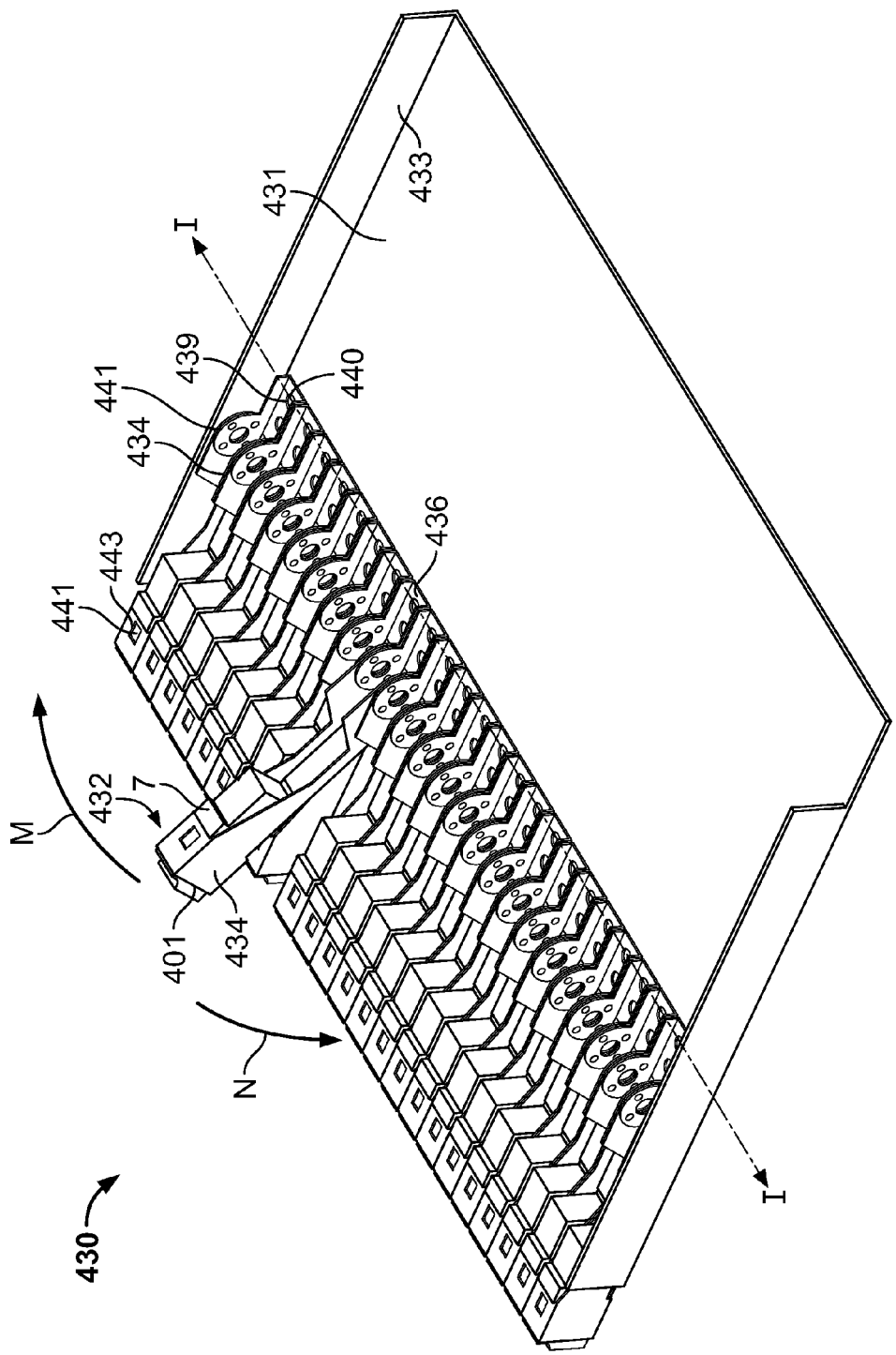
FIG. 11 is a perspective view of one of the patch panel devices of FIG. 10 including a plurality of attachment members.

As shown best in FIG. 11, a plurality of attachment members 432 is secured to the tray 431. In an embodiment, the attachment members 432 may be linearly arranged with respect to one another along a common axis I. Each attachment member 432 includes the first section 434 and the second section 436, which are pivotably secured to each other. The second section 436 is fixedly secured to the tray 431. In an embodiment, the second section 436 may include one or more holes 439 configured and adapted to receive a suitable device 440, e.g., a screw, nail, tack, or the like, to facilitate securing of the attachment member 432 to the tray 431. In an embodiment, the second section 436 is fixedly secured to the tray 431 by an adhesive.

As shown best in FIG. 10, the plurality of patch panel devices 430 may be arranged along height H of the housing 2. During use, the communication patching system 400 facilitates access to the ports 7 that are operatively coupled to the attachment members 432. As shown in FIG. 10, tray 431 is translated away from the face P of the housing 2 in the direction of arrow Z. Translating the tray 431 away from the face P of the housing 2 separates the proximal end 401 of the patch panel device 430 from adjacent rows of patch panel devices 430. Once the patch panel device 430 is translated a sufficient distance in the direction of arrow Z, the first section 434 of one or more of the attachment members 432 may be radially translated about an axis parallel to the axis I (see FIG. 11), such as in direction M towards a top T of the housing 2 or in direction N towards a bottom B of the housing 2. Thus, the first section 434 of an attachment member 432 may be spaced apart from adjacently positioned attachment members 432 of the same patch panel device 430, as well as attachment members 432 of attachment members 432 of patch panel devices 430 positioned in adjacent rows along height H of the housing 2.

Another embodiment of a patch panel device is described with reference to FIGS. 14A-14D. A patch panel device 440 may include a plurality of attachment members 443 that are positioned adjacent to one another. Each attachment member may include a movable member 446, which is rotatable or pivotable relative to a movable member of another attachment member. The movable members 446 of adjacent members 443 may be operatively coupled to one another to permit rotation of one of the movable members 446 relative to the other movable member. In an embodiment, the movable members 446 may be coupled to one another in a snap-fit connection that permits radial movement of the movable members 446 relative to one another. At least two securement members 444 may be secured to opposing ends of the plurality of attachment members 443 and secure the attachment members 443 to a tray 441. In another embodiment, a securement member 444 may be positioned between each of the movable members 443. Each of the movable members 446 may be operatively coupled to one or more cables C3, which are shown only in part. The movable member 446 may include a cable adapter or connector 449, which may include a front surface 449a that may be operatively coupled to one cable C3 and a back surface 449b that may be operatively coupled to another cable C3. The movable member 446 may include a receptacle 447 in which the connector 449 may be releasably secured such that the connector 449 may be separated from the attachment member 443.

The movable members 446 may be positioned spaced a distance from an edge 441a of the tray 441 to permit the movable members 446 to rotate relative to the tray 441. In one embodiment, the tray 441 may include a cut-out (not shown) at the movable members to facilitate a range of movement of the movable members 446 relative to the tray 441. The tray 441 may have an axis z extending along its length, an axis y extending along its height, and an axis x extending its width. The securement member 444 may be coaxially aligned with the axis z extending along the length of the tray 441. A plurality of securement members 444 may be positioned in a row extending along axis x along the width of the tray 441.

As shown in FIGS. 14C-14D, the securement member 444 and a movable member 446 of the attachment member 443 may be pivotably connected to one another at a pivot point 448 such that the movable member 446 may be radially moved relative to the securement member 444 to define an angle G therebetween. In particular, the movable member 446 may radially pivot between the y and z axes and the angle G may be defined therebetween. When secured to the tray 441, the movable member 446 may pivot in a counter-clockwise direction T, but may be inhibited from pivoting in the opposite, clockwise direction by the tray 441. However, as discussed above, cut-outs in the tray 441 may reduce the interaction between the tray 441 and the movable member 446 to facilitate a greater range of movement of the movable member 446 with respect to the tray 441. In an embodiment, the angle G may be adjusted within a range between 0 and 135 degrees. In another embodiment, the angle G may be adjusted within a range between 0 and 90 degrees. For example, in one embodiment, the movable members 446 may be movable relative to one another to transition the patch panel device 440 between a first condition in which front surfaces 451 of the movable members 446 are substantially coplanar, and adjacent ones of the members 446 are spaced apart a first distance or contact each other, and a second condition in which the front surfaces 451 of respective adjacent members 446 are in different planes in accordance with the angle G that one of the adjacent members 446 is pivoted or rotated relative to the other adjacent members 446, where the other member 446 may or may not be at the same position as in the first condition.

As described with respect to the patching system 400, a plurality of patch panel devices 440 may also be supported within housing 2, and may be translatable into or out from the housing 2 in a direction along axis z. Once spaced apart from the housing 2, the movable member 446 may be pivoted with respect to the securement member 444, thereby spacing the surfaces 449a, 449b of the connector 449 from any adjacent connector 449 such that the cables C3 may be more accessible and readily grasped by a user to detach the cable C from the cable adapter or connector 449 of the movable member 446 (as shown in FIG. 14B).

Figure 15A:
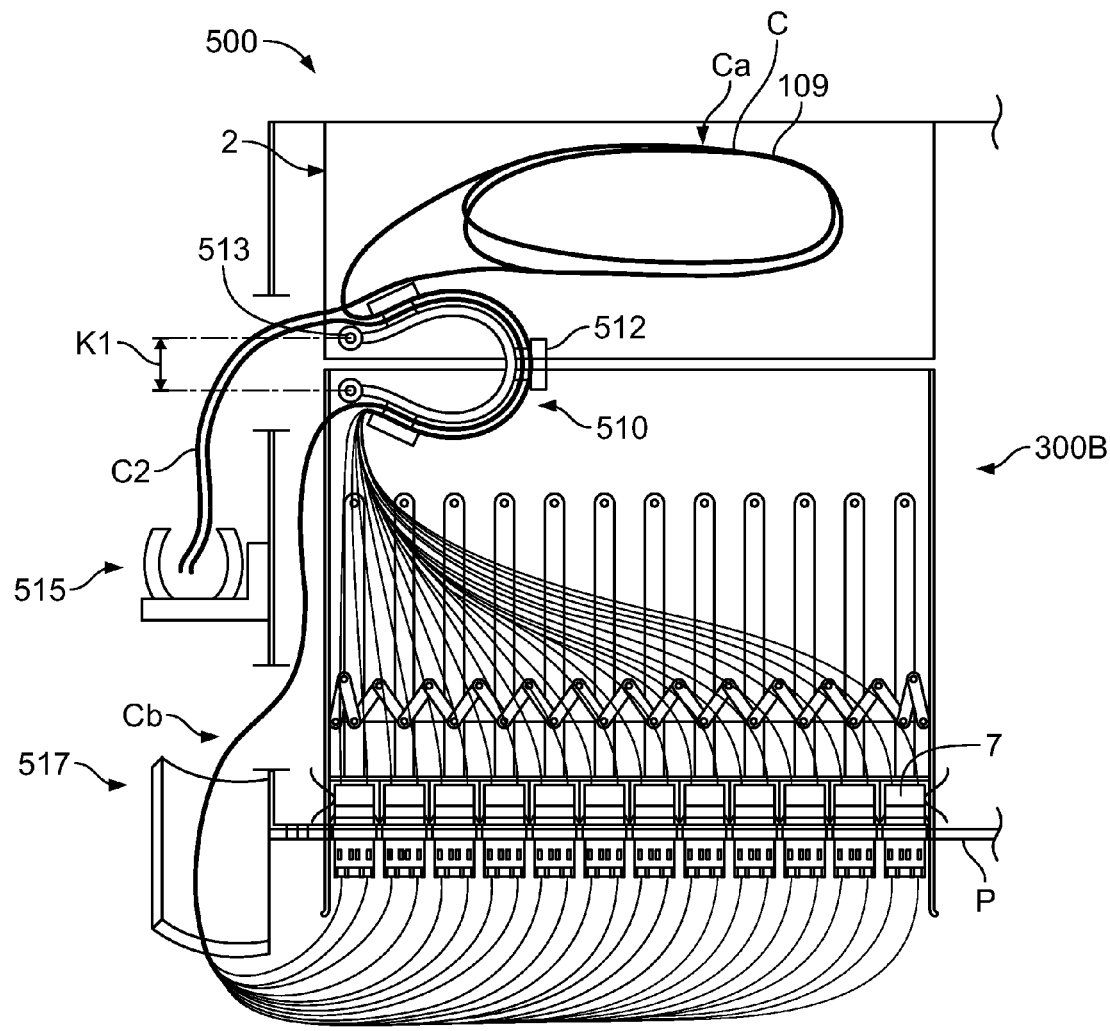
FIG. 15A is a top view of a communication patching system shown in a first state.
Figure 15B:
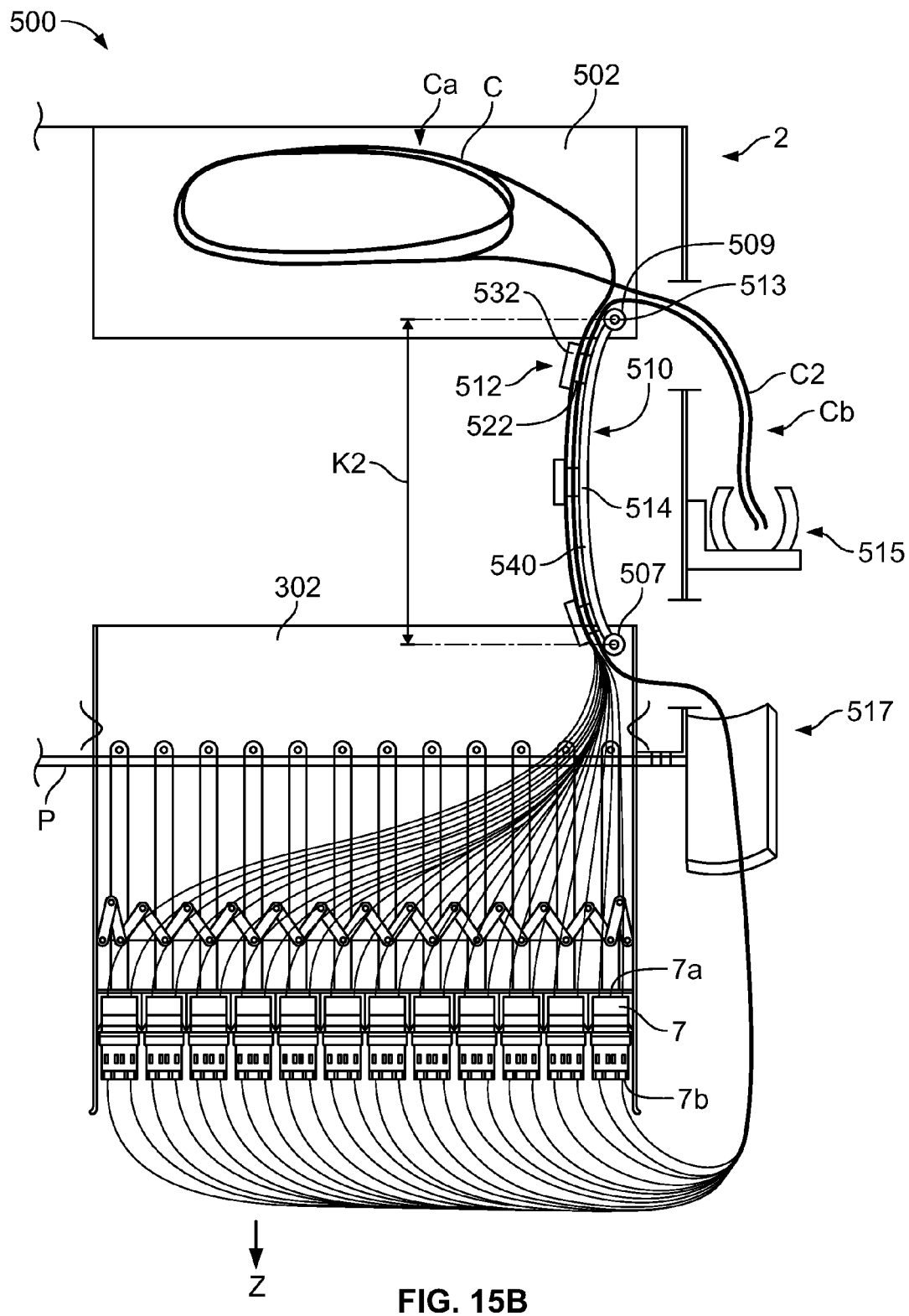
FIG. 15B is a top view of the communication patching system of FIG. 15A shown in a second state.

A system for managing cables, e.g., cables C, is described with reference to FIGS. 15A and 15B. Cable management system 500 includes any suitable patch panel device including but not limited to patch panel devices 110, 120A, 120B, 130, 140, 150, 205, 300A, 300B, 430, and 440. In an embodiment, as shown in FIGS. 15A and 15B, the cable management system 500 includes patch panel device 300B. The cable management system 500 includes a cable tensioner 510 that is transitionable between a first state (FIG. 15A) and a second state. The tensioner 510 is contracted or bent to a lesser extent in the second state than in the first state (FIG. 15B). The cable tensioner 510 is adapted such that, in any shape that the tensioner 510 may be configured during use, any portion of a cable C extending coupled to a surface of the tensioner 510 that is bent has at least a minimum radius of curvature, thereby avoiding damage to the cable and/or maintaining a desired level of optical energy transmittance through the cable. For example, the cable C may be coupled to an outer surface 540 of the tensioner 510 or alternatively an inner surface of the tensioner 510 which is configured as a deformable U-shaped groove.

As discussed with respect to the patch panel devices 110, 120A, 120B, 130, 140, 150, 200, 300A, 300B, 430, and 440, the patch panel devices are translatable away from the face P of housing 2. As the patch panel devices are translated away from the face P of housing 2, a first length portion Ca of cables C will correspondingly move. It is desirable that the movement of the cables C be controlled and managed such that the cables C, when bent, have at least a minimum bending radius, and also to inhibit the cables C, and in particular the first length portion Ca thereof, from interfering with the translation of the patch panel device with respect to housing 2.

As shown in FIGS. 15A and 15B, the first length portion Ca of cables C may be operatively coupled to distal ends 7a of the ports 7, and a second length portion Cb of cables C2 may be operatively coupled to the proximal ends 7b of the port 7. The housing 2 may include cable guides and supports. In an embodiment, the second length portion Cb of cables C2 is supported and guided by guides 515, 517, which provide support and guidance to the cables C2. The second length portion Cb of cables C2, which are connected to the proximal ends 7b of ports 7, may be supported by the guide 517, which defines a plane parallel to that of the tray 302, and extend coupled to the outer surface 540 of the cable tensioner 510 toward the guide 515. The guide 517 may guide the second grouping of cables Cb toward the cable tensioner 510 and to the guide 517 which may run entirely or partially along the length L of the housing 2. In another embodiment, the second length portion Cb of cables C2 is not operatively coupled to the cable tensioner 510.

The cable tensioner 510 includes a longitudinally extending, bendable member 514. The bendable member 514 may be formed from a material having shape memory properties, e.g., the bendable member 514 may be biased toward a bent shape. The bendable member 514 may be formed from any suitable material including, e.g., a polymer such as nylon or a shape memory material such as nickel titanium.

In an embodiment, the bendable member 514 may be formed from a material having shape memory properties, e.g., nickel titanium. The bendable member 514 may be biased toward a first state having a predetermined curvature or bent shape (FIG. 15A). The bendable member 514 is configured to be coupled to the cables C and C2. In an embodiment, the bendable member 514 includes protrusions 512 that include a head 532 and a neck 522. The neck 522 may be configured to receive the cables C and C2 extending therethrough, and provides support to the cables C and C2 placed between the head 532 and the bendable member 514. The head 532 may frictionally engage the cables 514 to inhibit separation of the cables C and C2 from the bendable member 514. The ends 507, 509 of the cable tensioner 510 are generally opposing. One of the ends 507 is secured to the tray 302 of the patch panel device 300B, and the other end 509 is secured to a distal end of the housing 2 or to another tray 502 that is secured to the back of the housing 2 and is generally coplanar with the tray 302.

During use, translating the patch panel device 300B away from the face 2 of the housing 2 results in the distance between the opposing ends 507, 509 of the bendable member to transition from distance K1 to distance K2, where K2 is greater than K1. Movement of the opposing ends 507, 509 towards each other results in the bendable member 514 bending or having a bowed outward shape. Conversely, movement of the opposing ends 507, 509 apart straightens the bendable member 514. Thus, the cables 509 move in a controlled manner with the bending able member 514, thereby inhibiting bending of the cables C to have a radius of curvature less than a minimum radius of curvature and the cables potentially interfering with movement of the tray 302.

Figure 16:
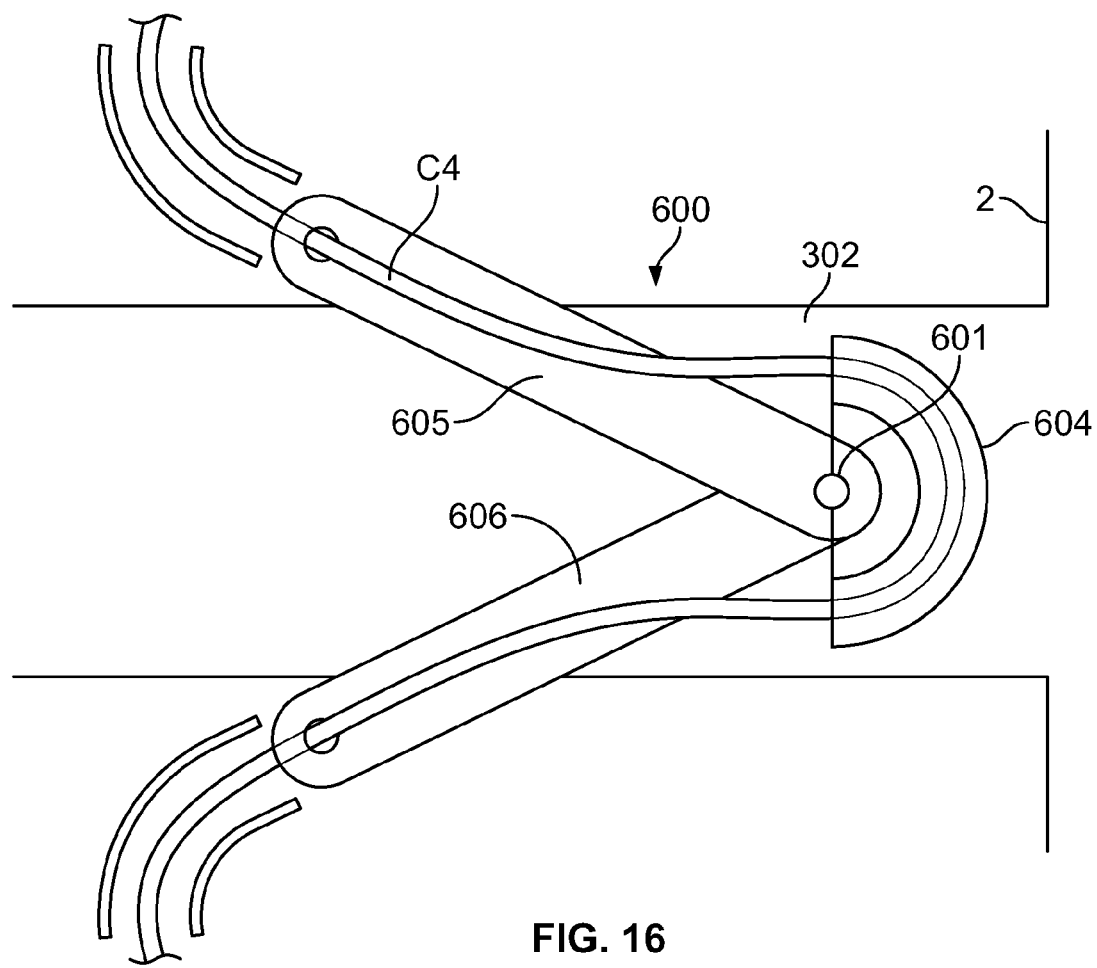
FIG. 16 is a top view of a cable tensioner.

Another embodiment of a cable tensionser is shown and described with reference to FIG. 16. Cable tensioner 600 includes a guide groove 604, a first tensioner member 605, and a second tensioner member 606. The first and second tensioner members 605, 606 are pivotable with respect to each other in a scissor-like relationship. The tensioner 600 may be attached to a horizontally aligned tray, such as the trays described above with reference to the other embodiments, of the housing 2, such that the guide groove 604 is fixed in orientation with respect to a distal portion of the housing 2, e.g., tray 302 (FIGS. 15A-15B), and the proximal ends of the cable tensioner 600 are secured to a tray of a patch panel, e.g., tray 302. The first and second tensioner members 605, 606 may be joined to each other at pivot point 601. The proximal ends of the first and second tensioner members 605, 606 may be operatively coupled to the tray, e.g., tray 302 of a patch panel. Cable C4 may be operatively coupled to the first and second tensioner members 605, 606 and guided around the guide groove 604, which has a predefined radius of curvature. As the tray of the patch panel, e.g., tray 502, is translated, the orientation of the guide groove 604 relative to the tray remains fixed and the angle defined between the cable tensioner members 605, 606 changes, such that the cable tensioner 600 takes up the slack in the cable C by the members 605, 606 rotating about the pivot 601 toward each other as the tray is moved into the housing 2 and sufficient slack in the cable C4 is provided by the cable tensioner as the tray is moved out of and away from the housing 2 by the members 605, 606 rotating about the pivot point 601 away from each other.

In any of the embodiments described herein, it is to be understood that any suitable connector may be used. For example, an LC type connector may be used. However, an LC connector is only one example of a small form connector that may be used. Differently sized connectors, whether larger or smaller may be used. As discussed above, connectors may be configured to be coupled to one or more cables, e.g., simplex or duplex. Specific connectors shown and described herein are merely illustrative embodiments. Connectors that are differently configured and/or sized may be utilized without deviating from the scope and spirit of the present invention.

Although the invention herein has been described with reference to particular embodiments, it is to be understood that these embodiments are merely illustrative of the principles and applications of the present invention. It is to be understood unless otherwise indicated herein that the figures are not intended to be to scale. It is therefore to be understood that numerous modifications may be made to the illustrative embodiments and that other arrangements may be devised without departing from the spirit and scope of the present invention as defined by the appended claims.

The invention claimed is:

1. A communication patch panel device, comprising:
a plurality of ports each operably connectable to a cable; and
a connection unit connected to the plurality of ports, the connection unit including a member extending in length from a first end to a second end of the member,
wherein the connection unit has a first state in which the member of the connection unit has a first length from the first end to the second end along which the ports are positioned and a second state in which the member of the connection unit has a second length from the first end to the second end along which the ports are positioned, the second length exceeding the first length.

2. The communication patch panel device of claim 1, wherein in the first state, adjacent ones of the ports are spaced apart a first distance and in the second state, the adjacent ones of the ports are positioned spaced apart a second distance, the second distance exceeding the first distance.

3. The communication patch panel device of claim 1, wherein in the second state, the ports are positioned spaced equidistant from one another.

4. The communication patch panel device of claim 1, wherein the connection unit includes a resilient element as the member that positions the ports at a predetermined spacing from one another when the patch panel is in the second state.

5. The communication patch panel device of claim 1, wherein the connection unit includes one or more rails as the member that slide relative to one another to define the first length, the second length, and a length from the first end to the second end intermediate the first and second lengths, wherein the one or more rails are coupled to the plurality of ports to define a distance between the ports, and wherein sliding movement of the one or more rails relative to one another adjusts the distance between the ports such that the member of the connection unit has a length of any of the first, second and intermediate lengths from the first end to the second end.

6. The communication patch panel device of claim 1, wherein the connection unit includes a bar as the member having a length adjustable to any of the first length, the second length, and a length from the first end to the second end intermediate the first and second lengths, the bar being coupled to the plurality of ports to define a gap distance between adjacent ones of the plurality of ports, the gap distance corresponding to the length to which the bar is adjusted.

7. A communication patch panel device of claim 1, wherein the communication panel device is configured to be supported by a housing.

8. The communication patch panel device of claim 7, wherein the housing includes a front face, and
wherein, when the panel is supported by the housing and transitioned from the first state to the second state, the panel moves away from the front face.

9. The communication patch panel device of claim 1, wherein the connection unit comprises:
a tray; and
a plurality of arms including a first portion and a second portion, the first portion of each arm pivotably coupled to the tray, the second portion of each arm operatively coupled to one of the plurality of ports, wherein pivoting of the arms effects transitioning of the connection unit between the first and second states.

10. A communication patch panel device, comprising:
a plurality of attachment members, each of the attachment members having a first end opposite a second end, and including a securement section spaced from the first end in a direction of the second end configured for fixedly coupling the attachment member to a tray and a second member having a connector having a front surface at the first end,
wherein, when the attachment members are fixedly coupled to the tray, respectively through the securement sections thereof, arranged linearly with respect to one another along a common axis, each of the second members individually has any of a plurality of positions relative to another of the second members, such that the communication patch panel device has a first condition in which the front surfaces are substantially coplanar and a second condition in which the front surfaces are in different respective planes.

11. The communication patch panel device of claim 10, wherein the connector is separable from the second member.

12. The communication patch panel device of claim 10, wherein the connector is configured to be releasably coupled to a first cable at the front surface.

13. The communication patch panel device of claim 10, wherein the connector further includes a back surface, the back surface being configured to be releasably coupled to a second cable.

14. The communication patch panel device of claim 10, wherein each of the second members is individually rotatable to the any of the plurality positions relative to the another of the second members.

15. The communication patch panel device of claim 10, further comprising:
the tray, in which the tray defines a surface, wherein, when the attachment members are fixedly coupled to the tray respectively through the securement sections thereof, each of the second members defines an angle with respect to the surface of the tray, the angle being adjustable.

16. The communication patch panel of claim 14, wherein the angle is adjustable between 0 and 135 degrees.

17. A communication patch panel system, comprising:
a housing including a front end and a back end;
a patch panel device including a tray, the tray movable along an axis extending from the front end to the back end of the housing; and
a cable tensioner including a first end and a second end, the first end of the cable tensioner secured fixedly in position relative to the housing, the second end of the cable tensioner secured to the tray, the cable tensioner operatively securable to a cable, the cable tensioner has a first state and a second state, in which in the second state a portion of the tensioner has a greater radius of curvature than in the first state, wherein the first and second states are obtained in response to translation of the tray between the front end and the back end of the housing.

18. The communication patch panel system of claim 17, wherein the cable tensioner further includes a first member and a second member, the first and second members being pivotably coupled to one another at the second end of the cable tensioner, the first and second members defining an angle therebetween, the angle between the first and second members changing in response to the translation of the tray and causing a change in the radius of curvature.

19. The communication patch panel system of claim 17, wherein the first end of the cable tensioner includes a guide groove having a curve configured to guide a cable thereon.

20. The communication patch panel of claim 17, wherein the cable tensioner is formed from a bendable material.

* * * * *